US011023068B1

(12) United States Patent
Jeon et al.

(10) Patent No.: US 11,023,068 B1
(45) Date of Patent: Jun. 1, 2021

(54) ELECTRONIC DEVICE

(71) Applicant: LG ELECTRONICS INC., Seoul (KR)

(72) Inventors: Sangkuk Jeon, Seoul (KR); Jaewoo Jeong, Seoul (KR); Jonghwan Kim, Seoul (KR); Minkyoung Chang, Seoul (KR); Yujune Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 210 days.

(21) Appl. No.: 16/474,877

(22) PCT Filed: Dec. 29, 2016

(86) PCT No.: PCT/KR2016/015527
§ 371 (c)(1),
(2) Date: Jun. 28, 2019

(87) PCT Pub. No.: WO2018/124343
PCT Pub. Date: Jul. 5, 2018

(51) Int. Cl.
*G06F 3/041* (2006.01)

(52) U.S. Cl.
CPC .................. *G06F 3/0416* (2013.01)

(58) Field of Classification Search
CPC ...................................................... G06F 3/0416
(Continued)

(56) References Cited

U.S. PATENT DOCUMENTS

| 2012/0092293 | A1 | 4/2012 | Ganapathi et al. |
| 2014/0292396 | A1* | 10/2014 | Bruwer ................ H03K 17/962 327/517 |

(Continued)

FOREIGN PATENT DOCUMENTS

| EP | 2226741 B1 | 4/2016 |
| KR | 10-1085448 B1 | 11/2011 |

(Continued)

*Primary Examiner* — Chineyere D Wills-Burns
(74) *Attorney, Agent, or Firm* — Birch, Stewart, Kolasch & Birch, LLP

(57) ABSTRACT

An electronic device includes a touch screen configured to display screen information and receive a touch input; a touch sensing module including a first sensing layer having a plurality of first electrode lines and a second sensing layer having a plurality of second electrode lines extending in a direction intersecting the first electrode lines; a plurality of first and second switches configured to selectively connect the plurality of first and second electrode lines to a circuit board; and a controller configured to in response to the received touch input having a touch pressure below a predetermined pressure, control the first switches to connect respective first electrode lines corresponding to a touch area of the touch input, and execute a first function corresponding the received touch input, in response to the received touch input having the touch pressure equal to or above the predetermined pressure, control the second switches to connect respective first and second electrode lines corresponding to the touch area of the touch input to change a first sensing resolution of the touch area to a second sensing resolution higher than the first sensing resolution, and obtain fingerprint information of a finger making contact with the touch area, and execute a second function more secure than the first function based on the obtained fingerprint information matching prestored fingerprint information.

16 Claims, 33 Drawing Sheets

(58) Field of Classification Search
USPC .......................................................... 345/173
See application file for complete search history.

(56) References Cited

U.S. PATENT DOCUMENTS

| | | | |
|---|---|---|---|
| 2016/0335467 A1* | 11/2016 | Su | G06K 9/0002 |
| 2016/0335497 A1 | 11/2016 | Williams et al. | |
| 2016/0350571 A1* | 12/2016 | Han | G06F 3/04164 |
| 2017/0024597 A1* | 1/2017 | Cho | G06F 3/04883 |
| 2017/0024602 A1* | 1/2017 | Han | G06F 3/0445 |
| 2017/0206393 A1* | 7/2017 | Chia | G06F 21/32 |
| 2017/0336909 A1* | 11/2017 | Song | G06K 9/00013 |
| 2018/0348949 A1* | 12/2018 | Kim | G06K 9/0002 |
| 2019/0369799 A1* | 12/2019 | Jeon | G06F 3/0445 |
| 2020/0175143 A1* | 6/2020 | Lee | H04M 1/0266 |

FOREIGN PATENT DOCUMENTS

| | | | |
|---|---|---|---|
| KR | 10-2012-0033515 A | 4/2012 | |
| KR | 10-2016-0003272 A | 1/2016 | |
| KR | 10-2016-0096390 A | 8/2016 | |
| KR | 10-2016-0141180 A | 12/2016 | |

* cited by examiner (a)

(b)

(c)

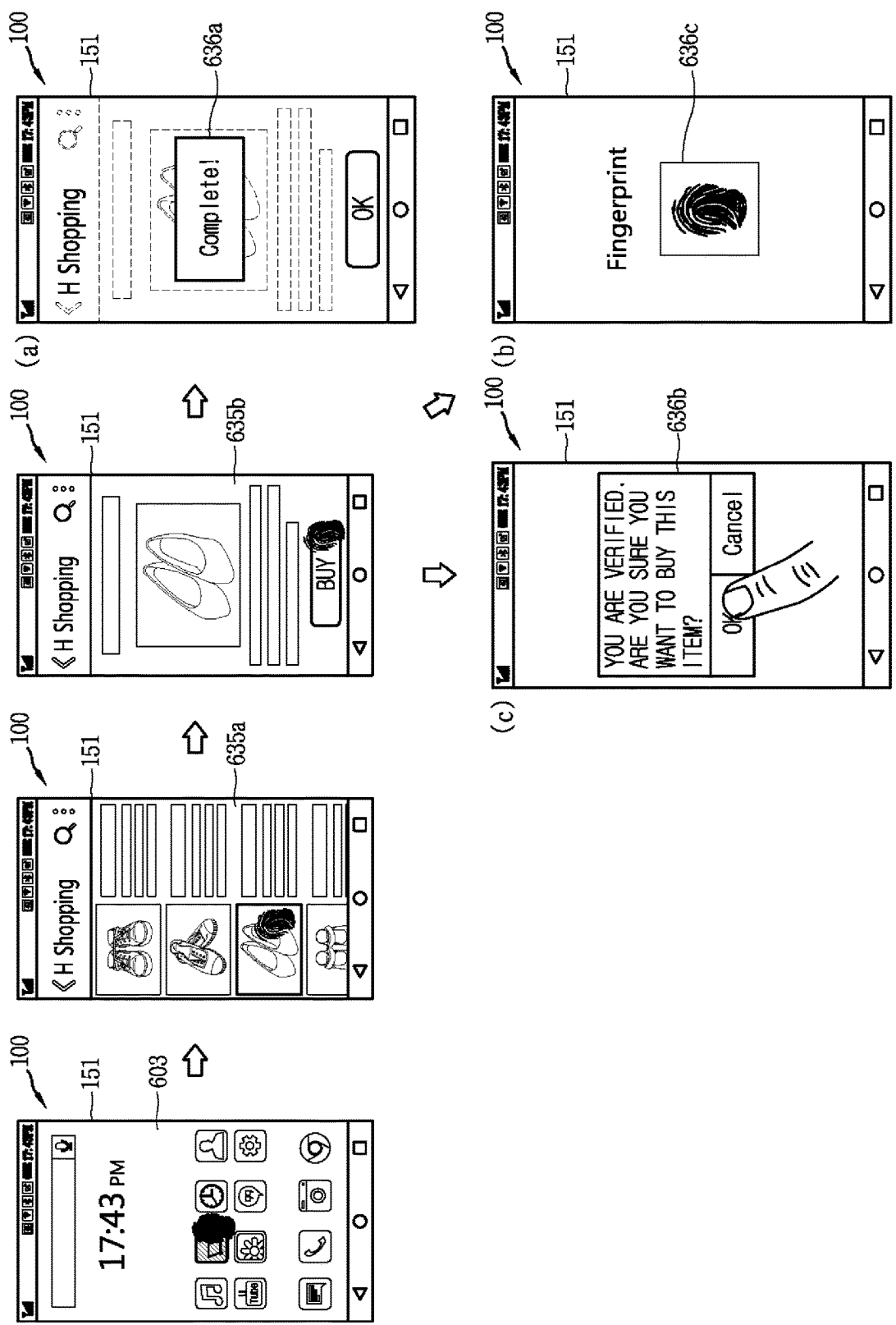

ELECTRONIC DEVICE

CROSS-REFERENCE TO RELATED APPLICATIONS

This application is the National Phase of PCT International Application No. PCT/KR2016/015527 filed on Dec. 29, 2016, the contents of which are incorporated by reference herein in its entirety.

BACKGROUND OF THE INVENTION

Field of the Invention

The present invention relates to a mobile terminal and a method for controlling the same.

Discussion of the Related Art

Terminals may be divided into mobile/portable terminals and stationary terminals according to mobility. Also, the mobile terminals may be classified into handheld types and vehicle mount types according to whether or not a user can directly carry.

The terminal has various functions according to development of technologies. For example, a mobile terminal can be allowed to capture still images or moving images, play music or video files, play games, receive broadcast and the like, so as to be implemented as an integrated multimedia player. Efforts are ongoing to support and increase the functionality of terminals. Such efforts include software improvements, as well as changes and improvements in the structural components.

In recent years, biometric user authentication technologies have been developed. In particular, a fingerprint sensing device, which uses fingerprint data having unique biometric information of an individual as a user authentication method, has been applied to a mobile terminal. However, in a mobile terminal employing a fingerprint sensor, a fingerprint can only be detected in a specific area of the mobile terminal.

SUMMARY OF THE INVENTION

Therefore, one aspect of the present invention is to provide a mobile terminal capable of detecting a fingerprint on one area of a touch screen.

In order to achieve the aspect and other advantages of the present invention, there is provided an electronic device including a touch screen having a display area for displaying screen information and receiving a touch input at a first sensing resolution, and a controller configured to execute a first function based on the touch input. The controller may change a sensing resolution of at least one area including a touch area on the touch screen to a second sensing resolution, which is higher than the first sensing resolution, so as to obtain fingerprint information of a finger making contact with the touch area while the touch input is being applied, and execute a second function related to the first function based on fingerprint information detected.

In one embodiment of the present invention, a touch sensing module may be further provided. The touch sensing module may include a first sensing layer having a plurality of first electrode lines, and a second sensing layer having a plurality of second electrode lines extending in a direction intersecting the first electrode lines. Each of the plurality of first and second electrode lines may be connected to a circuit board by one of a plurality of first and second switches. Accordingly, a sensing resolution may be changed by grouping a plurality of electrode lines, thereby sensing a touch input or acquiring fingerprint information.

In one embodiment of the present invention, a pressure sensor may be further provided. The pressure sensor is disposed below a cover glass to sense pressure of a touch input. When pressure is sensed by the pressure sensor, a controller may change the first sensing resolution, which allows a user to perform a different function by applying a pressed touch input. In addition, the user can quickly obtain desired information without going through an additional user authentication procedure.

ADVANTAGEOUS EFFECTS

According to an embodiment of the present invention, an additional fingerprint sensor is unnecessary since a sensing resolution of a touch sensing layer for sensing a touch input applied to a touch screen is changed to detect a fingerprint.

In addition, fingerprint information can be acquired in any area on a touch screen. Thus, fingerprint sensing information can be obtained while a touch input for controlling a specific function is applied.

Further, a function can be performed without a separate user authentication procedure based on fingerprint information acquired while receiving a touch input.

BRIEF DESCRIPTION OF THE DRAWINGS

FIGS. 10C and 10D are conceptual views illustrating a control method of a mobile terminal in accordance with another embodiment of the present invention.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
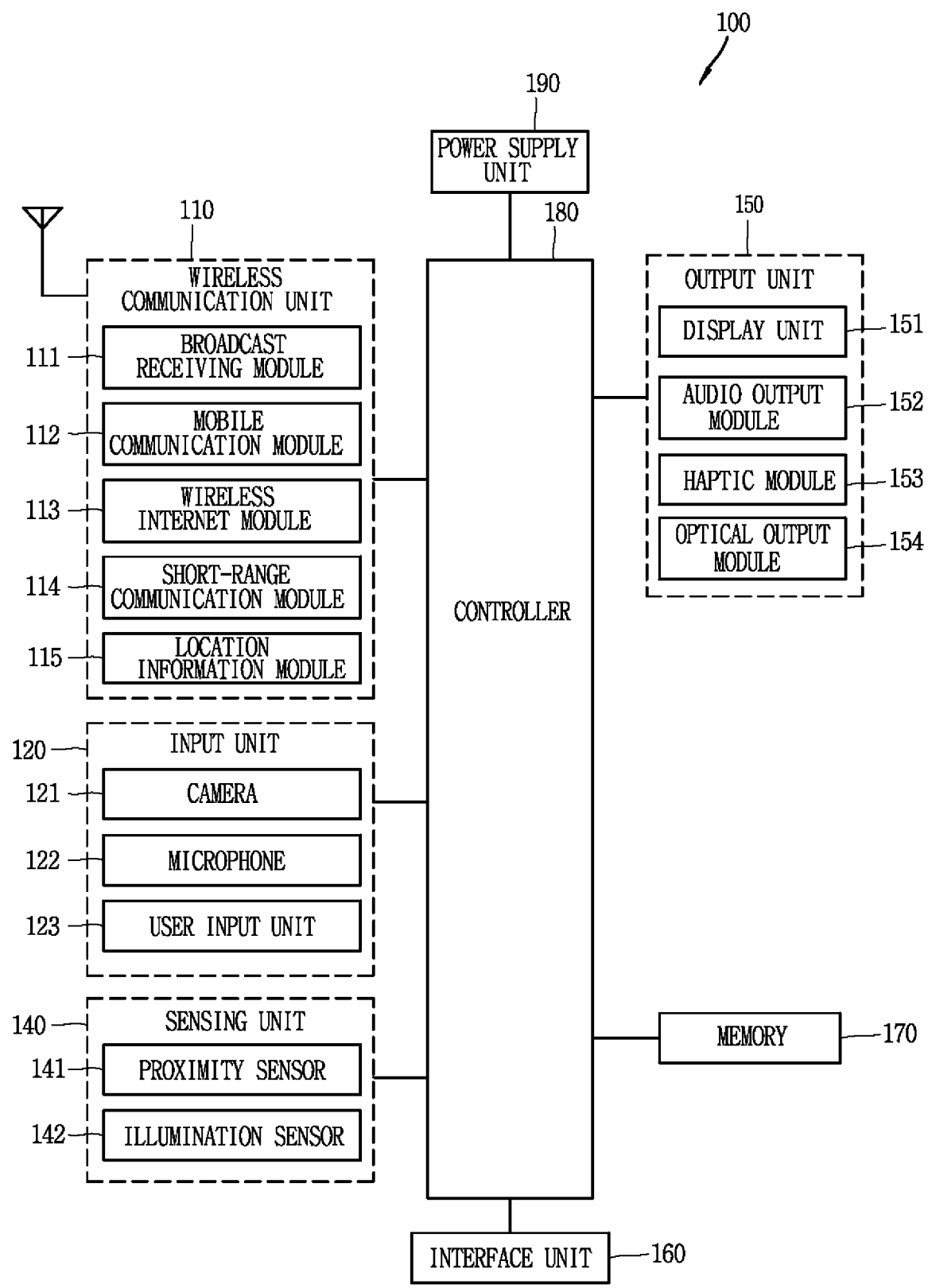
FIG. 1A is a block diagram of a mobile terminal according to an embodiment of the present invention.

FIG. 1A is a block diagram of a mobile terminal 100 in accordance with an exemplary embodiment of the present invention.

The mobile terminal 100 may be shown having components such as a wireless communication unit 110, an input unit 120, a sensing unit 140, an output unit 150, an interface unit 160, a memory 170, a controller 180, and a power supply unit 190. FIG. 1 shows the mobile terminal 100 having various components, but it may be understood that implementing all of the illustrated components is not a requirement. Greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal 100, the surrounding environment of the mobile terminal 100, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the wearable device 100, under the control of the controller 180. The power supply unit 190 may include a battery, and the battery may be configured as an embedded battery or a detachable battery.

At least part of the components may cooperatively operate to implement an operation, a control or a control method of the mobile terminal 100 according to various embodiments disclosed herein. Also, the operation, the control or the control method of the mobile terminal 100 may be implemented on electronic device by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneous reception of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another electronic device may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal 100. As an example, the location information module 115 includes a Global Position System (GPS) module, a Wi-Fi module, or both. For example, when the mobile terminal 100 uses a GPS module, a position of the mobile terminal 100 may be acquired using a signal sent from a GPS satellite. As another example, when the mobile terminal 100 uses the Wi-Fi module, a position of the mobile terminal 100 may be acquired based on information related to a wireless access point (AP) which transmits or receives a wireless signal to or from the Wi-Fi module. If desired, the location information module 115 may alternatively or additionally perform a function of any of the other modules of the wireless communication unit 110 to obtain data related to the position of the mobile terminal 100. The location information module 115 is a module used for acquiring the position (or the current position) of the mobile terminal 100, and may not be limited to a module for directly calculating or acquiring the position of the electronic device.

Next, the input unit 120 is for inputting image information (or signal), audio information (or signal), data, or information input from a user. For inputting image information, the mobile terminal 100 may be provided with a plurality of cameras 121. Such cameras 121 may process image frames of still pictures or video obtained by image sensors in a video or image capture mode. The processed image frames can be displayed on the display unit 151 or stored in memory 170. Meanwhile, the cameras 121 provided in the mobile terminal 100 may be arranged in a matrix configuration to permit a plurality of image information having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the electronic device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal 100, surrounding environment information of the mobile terminal 100, user information, or the like, and generates a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal 100 covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, the controller 180 may process data corresponding to proximity touches and proximity touch patterns sensed by the proximity sensor 141, and cause visual information corresponding to the processed data to be output on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the touch screen, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the object in vicinity of the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 may output a signal for indicating an event generation using light of a light source of the mobile terminal 100. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal 100 emits monochromatic light or light with a plurality of colors to a front or rear surface. The signal output may be terminated as the mobile terminal 100 senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the mobile terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal 100 meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, description will be given of a structure of the mobile terminal 100 according to one embodiment of the present invention illustrated in FIG. 1A or a terminal having those components, with reference to FIGS. 1B and 1C.

Figure 1B:
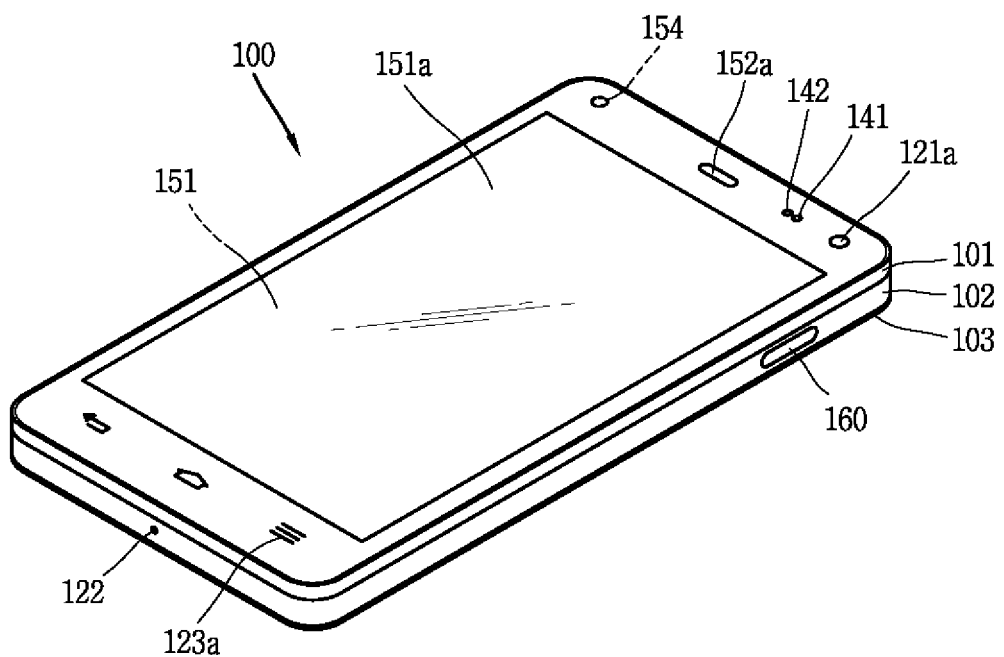
FIGS. 1B and 1C are views of a mobile terminal according to one exemplary embodiment of the present invention, viewed from different directions.
Figure 1C:
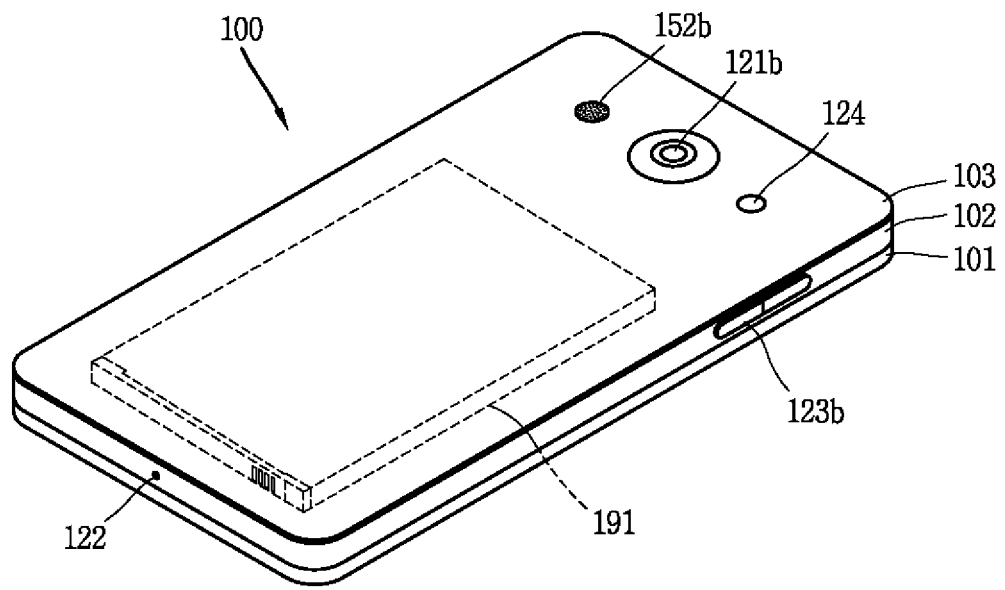

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally be applied to other types of mobile terminals as well. Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be designated.

On the other hand, the touch sensor may be configured in a form of a film having a touch pattern and disposed between a window and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit 123 (see FIG. 1A). In some cases, the touch screen may replace at least some of functions of a first manipulation unit 123a. Hereinafter, for the sake of explanation, the display unit (display module) for outputting the image and the touch sensor are collectively referred to as a touch screen 151.

The first audio output module 152a may be implemented as a receiver for transmitting a call sound to a user's ear and the second audio output module 152b may be implemented as a loud speaker for outputting various alarm sounds or multimedia reproduction request sounds.

The window 151a of the display unit 151 may include a sound hole for emitting sounds generated from the first audio output module 152a. However, the present invention is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123*a* located on the front surface of the terminal body. Accordingly, when the first manipulation unit 123*a* is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* may be further mounted to the rear surface of the terminal body. The second camera 121*b* may have an image capturing direction, which is substantially opposite to the direction of the first camera unit 121*a*.

The second camera 121*b* may include a plurality of lenses arranged along at least one line. The plurality of lenses may be arranged in a matrix form. The cameras may be referred to as an 'array camera.' When the second camera 121*b* is implemented as the array camera, images may be captured in various manners using the plurality of lenses and images with better qualities may be obtained.

The flash 124 may be disposed adjacent to the second camera 121*b*. When an image of a subject is captured with the camera 121*b*, the flash 124 may illuminate the subject.

The second audio output module 152*b* may further be disposed on the terminal body. The second audio output module 152*b* may implement stereophonic sound functions in conjunction with the first audio output module 152*a*, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

An antenna according to the present invention includes an antenna pattern 110' formed in one area of the mobile terminal body 100. The antenna pattern 110' has a predetermined length to transmit and receive a radio signal in a predetermined frequency range. For example, the antenna pattern 110' according to one exemplary embodiment of the present invention may be formed at a lower end portion of the mobile terminal body 100. However, a placement position of the antenna pattern 110' is not limited thereto. For example, the antenna pattern 110' may be formed on one area of the rear cover 103, or on an inner frame that forms an inner structure of the mobile terminal body 100.

FIGS. 2A to 2F are conceptual views illustrating a structure of a display module and a touch sensor according to various embodiments of the present invention.

Figure 2A:
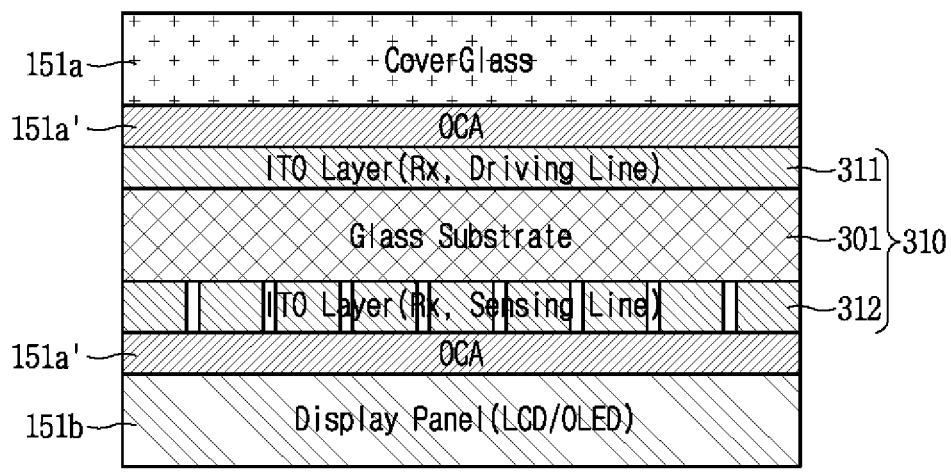
FIGS. 2A to 2F are conceptual views illustrating a structure of a display module and a touch sensing module in accordance with various embodiments of the present invention.

A touch screen 151 according to FIG. 2A includes a cover glass 151*a*, a display module 151*b*, and a touch sensing module 310. The touch sensing module 310 is formed on the display module 151*b*, and the cover glass 151*a* is formed on the touch sensing module 310. An adhesive layer (OCA) 151*a'* is formed between the display module 151*b* and the touch sensing module 310, and between the cover glass 151*a* and the touch sensing module 310, respectively.

The touch sensing module 310 is formed on both surfaces of a glass substrate 301, and includes first and second sensing layers 311, 312 which include a plurality of electrode lines intersecting with each other. The first and second sensing layers 311, 312 are formed with a Tx layer and an Rx layer, respectively.

The first and second sensing layers 311, 312 are insulated by the glass substrate 301. Capacitance is changed by a finger making contact with the cover glass 151*a*, and a touch input is sensed through changes in the capacitance.

Figure 2B:
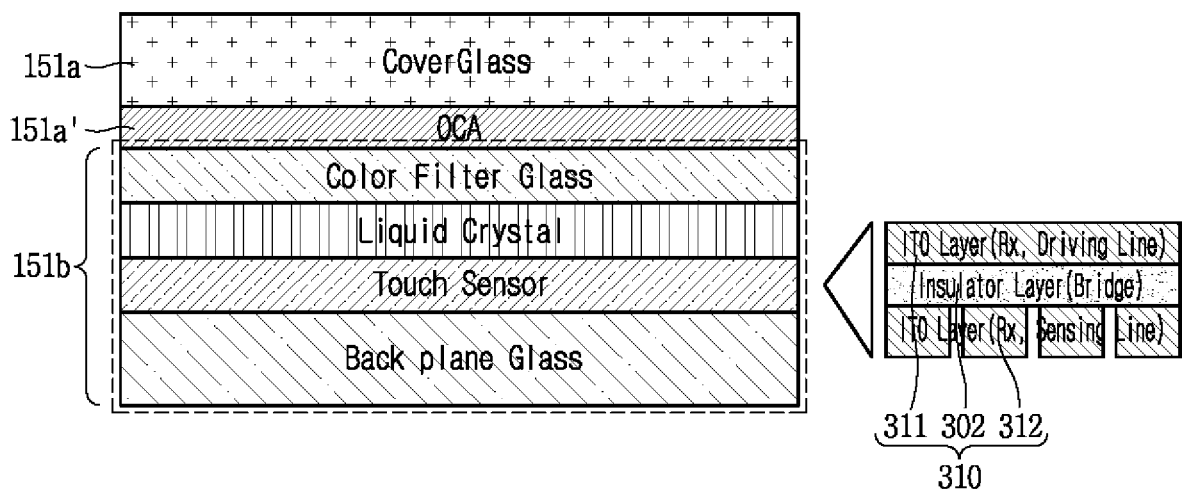

In a touch screen 151 according to FIG. 2B, the display module 151*b* is coupled below the cover glass 151*a* by the adhesive layer 151*a'*. The display module 151*b* includes a backplane glass having a back light, a liquid crystal layer, and a color filter layer. The touch sensing module 310 is formed on the backplane glass.

The first sensing layer 311 is formed on the backplane glass, and an insulator layer 302 is formed in contact with the first sensing layer 311. The second sensing layer 312 is formed on the insulator layer 302 and the backplane glass so as not to be in contact with the first sensing layer 311. Accordingly, the first and second sensing layers 311, 312 may be formed on the backplane glass in an insulated state from each other by the insulator layer 302.

Figure 2C:
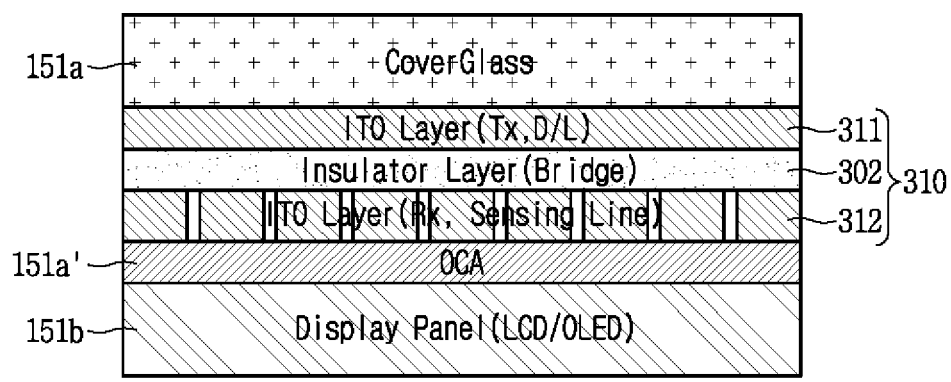

Referring to FIG. 2C, the first and second sensing layers 311, 312 are formed in contact with the cover glass 151a. For example, the first sensing layer 311 is formed in an inner surface of the cover glass 151a, and the insulator layer 302 is formed in contact with the first sensing layer 311. The second sensing layer 312 is formed on the insulator layer 302 and the cover glass 151a so as not to be in contact with the first sensing layer 311.

The display module 151b is mounted below the cover glass 151a formed integrally with the touch sensing module 310. According to these embodiments, the first and second sensing layers, which need to be insulated from each other, are formed on one glass substrate (window or backplane glass), thereby reducing a thickness of a touch screen.

Figure 2D:
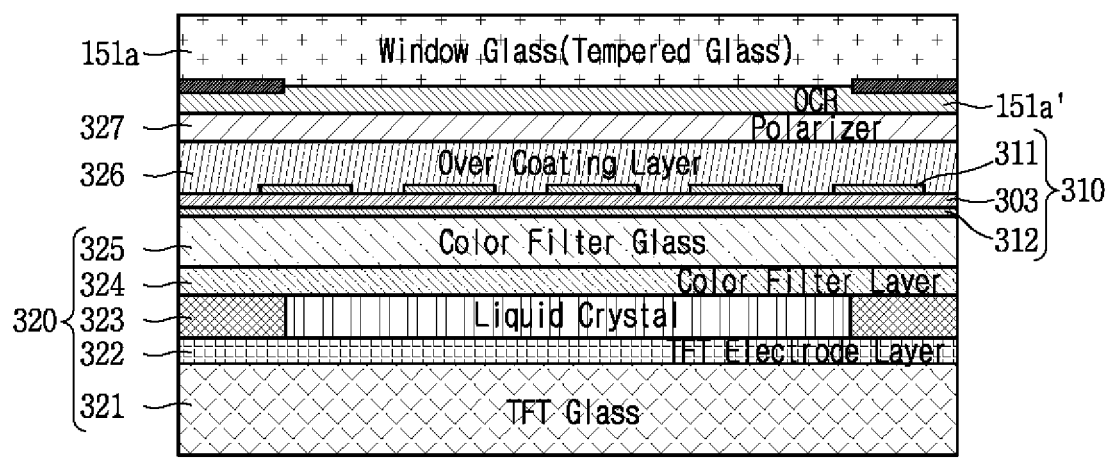

Referring to FIG. 2D, an insulator layer 303, and a first sensing layer 311, and a second sensing layer 312 constituting a touch sensing module 310 may be disposed between each component of a display module 320.

The display module 320 includes a TFT electrode layer 322 formed on one surface of a TFT glass 321, a color filter layer 324 formed on one surface of a color filter glass 325, a liquid crystal layer 323 disposed between the color filter layer 324 and the TFT electrode layer 322, and a polarizer 327 disposed on the color filter glass 325. The polarizer 327 is attached by a transparent adhesive layer (OCA) 151a'.

The TFT electrode layer 322 is formed on the TFT glass 321, and the color filter layer 324 is formed on the color filter glass 325. The liquid crystal layer 323 is disposed between the color filter layer 323 and the TFT electrode layer 322.

The second sensing layer 312 is formed on the color filter glass 325, and the insulator layer 303 is disposed on the second sensing layer 312. The first sensing layer 311 is formed on the insulator layer 303.

A coating layer 326 is formed on the first sensing layer 311 and a polarizer 327 attached to a cover (or window) glass 151a is formed on the coating layer 326. In other words, since the first and second sensing layers 311, 312 are formed on the color filter glass 325, which is used for a glass substrate among the components of the display module 151b, no additional configuration is required, thereby reducing a thickness of a display module.

Figure 2E:
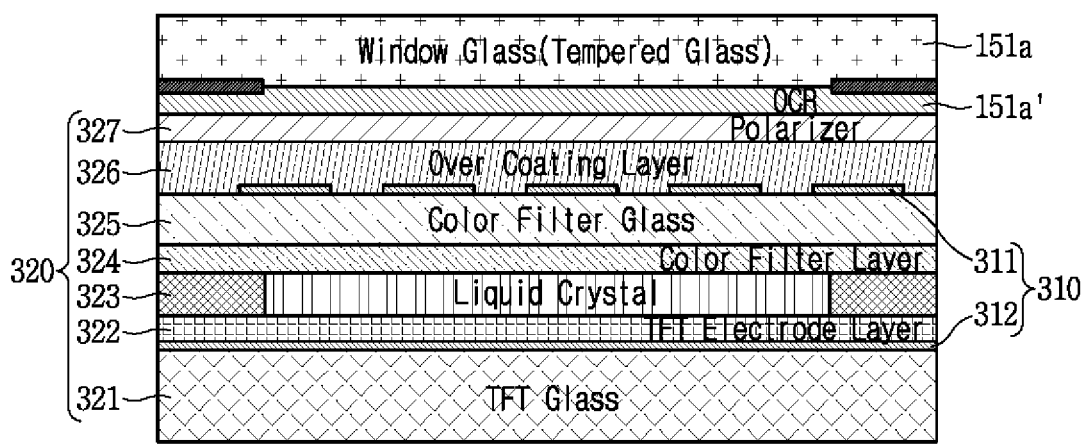

Referring to FIG. 2E, the display module 320 includes the TFT electrode layer 322 formed on one surface of the TFT glass 321, the color filter layer 324 formed on one surface of the color filter glass 325, the liquid crystal layer 323 disposed between the color filter layer 324 and the TFT electrode layer 322, and the polarizer 327 disposed on the color filter glass 325. The polarizer 327 is attached by the transparent adhesive layer 151a'.

The first sensing layer 311 is formed on the color filter glass 325, and the coating layer 326 is formed on one surface on which the first sensing layer 311 is formed. The second sensing layer 312 is formed on the TFT glass 321.

Figure 2F:
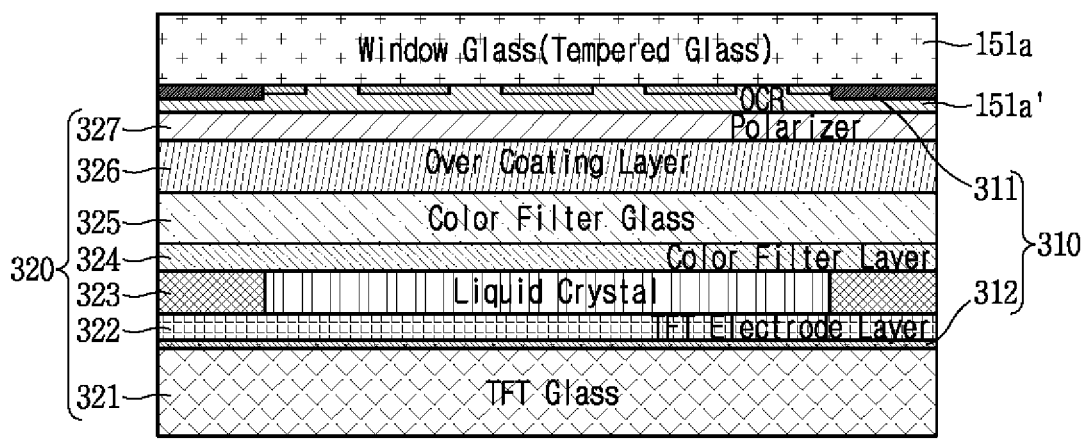

Referring to FIG. 2F, the second sensing layer 312 is formed on the TFT glass 321, but the first sensing layer 311 is formed on one surface on which the polarizer 327 of the cover glass 151a is formed. In other words, according to the embodiments, the first and second sensing layers included in the touch sensing module (or layer) 310 may be disposed in different areas of the display module and the cover glass.

Hereinafter, a method for controlling the touch sensing module 310 having the first and second sensing layers will be described.

Figure 3A:
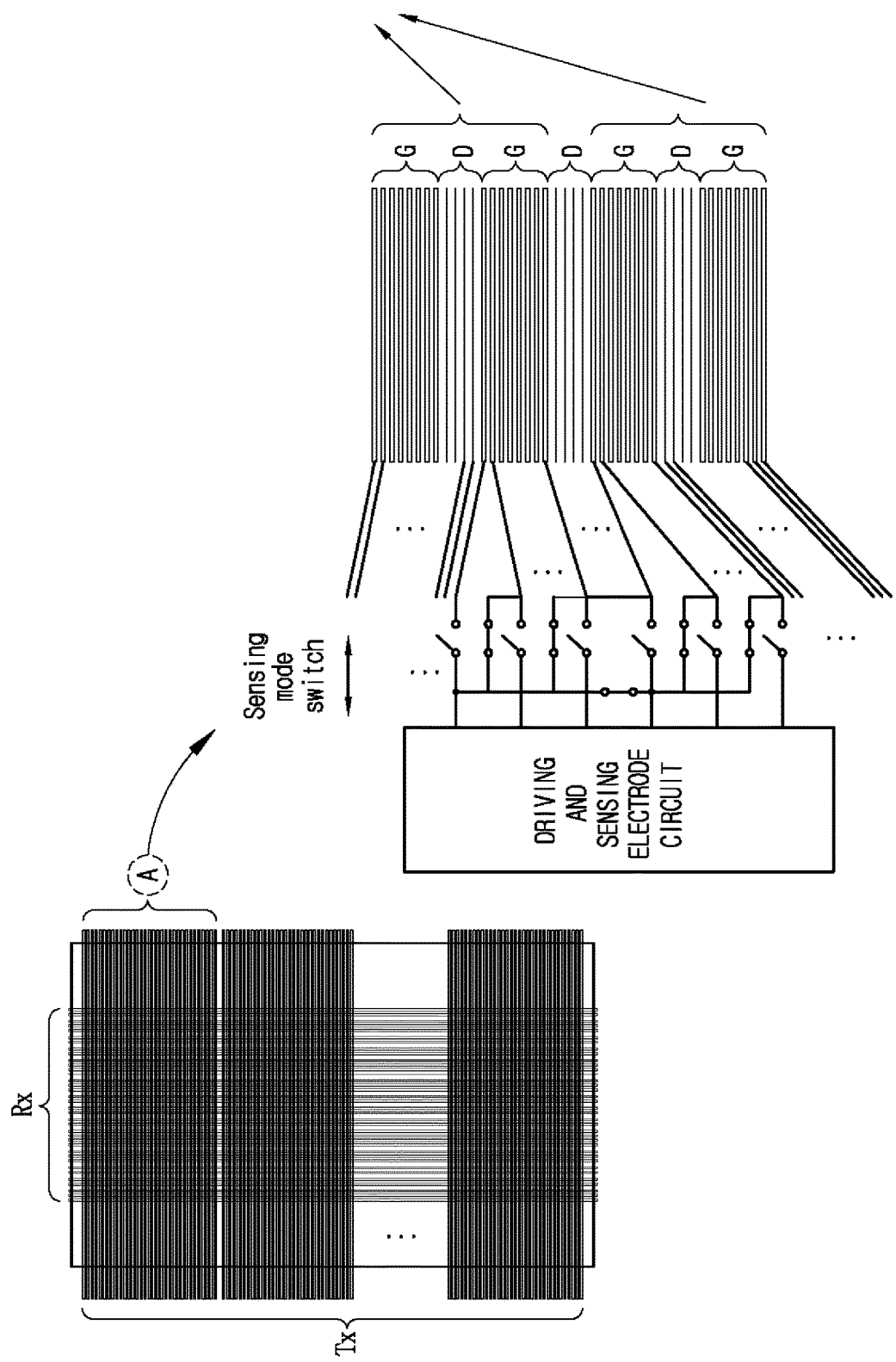
FIGS. 3A to 3C are conceptual views illustrating a control method for changing a sensing resolution of a touch sensing module.
Figure 3B:
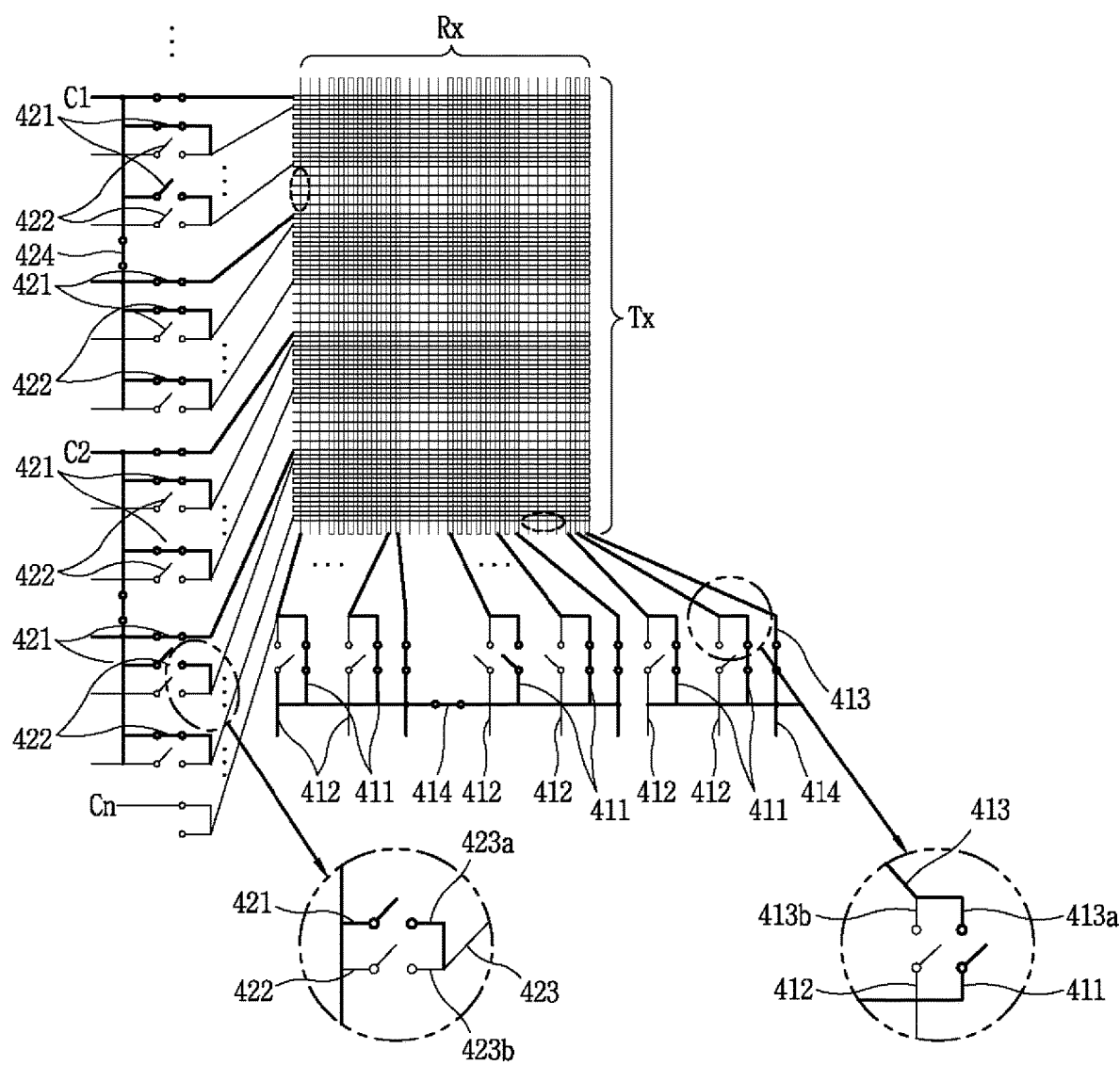
Figure 3C:
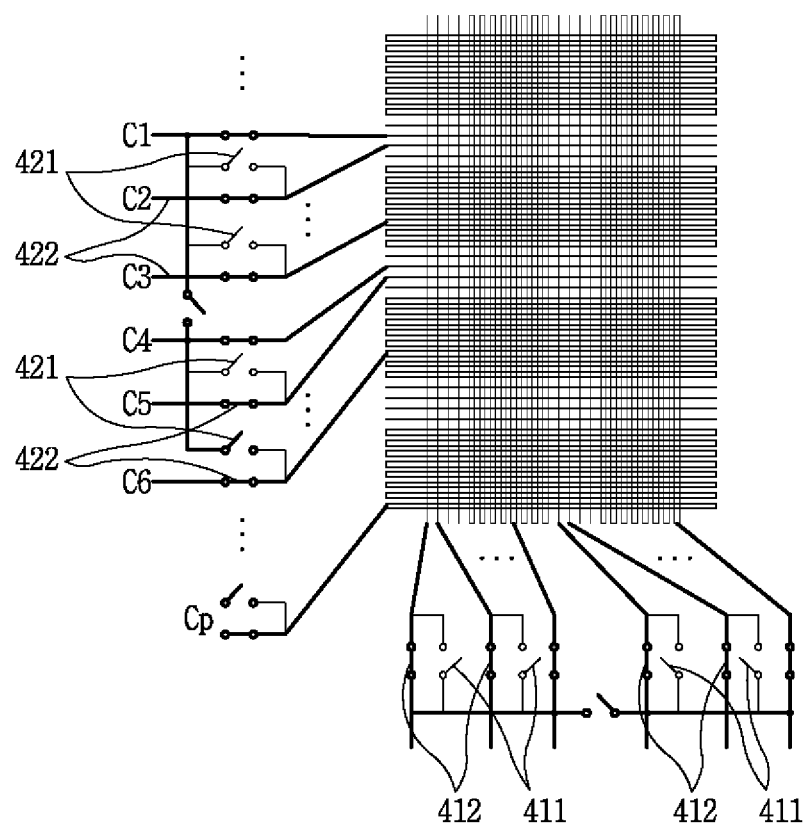

FIGS. 3A to 3C are conceptual views illustrating a control method for changing a sensing resolution of a touch sensing module. Referring to FIG. 3A, the touch sensing module 310 includes first electrode lines Tx and second electrode lines Rx arranged in directions intersecting with each other. The first electrode lines form the first sensing layer, and the second electrode lines form the second sensing layer, and may have a structure according to one of the embodiments of FIGS. 2A to 2F.

The first and second electrode lines are connected to a switch unit, respectively. At least part of the plurality of first electrode lines is connected to a plurality of first switches or second switches, respectively, and are electrically connected to the circuit board. One first electrode line connected to the first switch is grouped with another first electrode line connected to the first switches so as to be connected to the circuit board as one single first electrode line. That is, first electrode lines adjacent to each other are formed as one single sensing electrode line when they are electrically connected to the circuit board by the first switch. Accordingly, a sensing resolution for detecting a finger touch is decreased. As a result, the touch sensing module has a first sensing resolution capable of sensing a general touch input.

On the other hand, when the first electrode line is electrically connected to the circuit board by the second switch, the one first electrode line is electrically connected to the circuit board as one single sensing electrode line. Thus, the sensing resolution is increased. Accordingly, the touch sensing module has a second sensing resolution that senses a finer touch than a general touch input to sense a fingerprint of a finger.

Hereinafter, a control method for changing a sensing resolution will be described with reference to FIGS. 3B to 3D.

FIG. 3B is a conceptual view illustrating an operation of a touch sensing module having a first sensing resolution for sensing a general touch input. Referring to FIG. 3B, the touch sensing module 310 is connected to a circuit board by a connecting line portion, and the connecting line portion is controlled based on a mode.

Each and every of the first and second electrode lines is connected to the first and second switches 411 and 412. The first and second switches 411, 412 control connection and disconnection. The first switch 411 groups each of the first electrode lines into a plurality of sensing electrode lines, and the second switch 412 forms the first and second electrode lines as respective sensing electrode lines. Accordingly, when the first electrode lines are connected to the first switches 411, a sensing resolution decreases, and when the second electrode lines are connected to the second switches 412, the sensing resolution increases. The plurality of first electrode lines 413 include first and second connecting portions 413a, 413b. The first and second connecting portions 413a, 413b may be selectively connected to the first and second switches 411, 412, respectively.

In a touch receiving mode, the controller 180 connects the first and second lines to the first switches 411 for grouping the plurality of first electrode lines. In the touch receiving mode, a touch is detected at the first sensing resolution. For example, in the touch receiving mode, the seven first electrode lines form one single touch (sensing) line. Meanwhile, a grouping switch 414 is further provided for ungrouping each grouped first electrode lines by the first switches 411 to form one single sensing electrode line again. When all of the grouping switches 414 are connected, the touch sensing module 310 may sense a touch input at the lowest sensing resolution.

Meanwhile, the plurality of second electrode lines are selectively connected by the first and second switches 421 and 422. The second electrode line 423 includes first and second connecting portions 423a, 423b connected to the first and second switches 421, 422, respectively.

Referring to FIG. 3B, the plurality of second electrode lines grouped by the first and second switches 421, 422 are electrically connected to the circuit board by N number of connection terminals. One connection terminal includes a predetermined number of electrode lines. The predetermined number of electrode lines grouped into one connection terminal is arranged adjacent to each other. Although not specifically illustrated in the drawing, the plurality of first electrode lines is also grouped into a specific number of terminals.

FIG. 3C is a conceptual view illustrating a control method for a touch sensing module 310 having a second sensing resolution for acquiring fingerprint information. The controller 180 connects all of the plurality of first and second electrode lines 413, 423 to the second switches 412, 422. Each of the first and second electrode lines 413, 423 connected to the second switches 412, 422 forms a sensing electrode line, and is connected to the circuit board. A connection terminal is formed on each of the first electrode lines to form P number of connection terminals Cp in the fingerprint sensing mode. Also, P number of connection terminals Cp are formed on each of the second electrode lines. Accordingly, the fingerprint information is detected at the resolution of pxp.

The P number may correspond to the number of each of the first electrode lines and the second electrode lines, which is greater than the N number. That is, the controller 180 may change the sensing resolution by connecting each of the grouped electrode lines to a circuit board.

In the fingerprint sensing mode, the controller 180 may switch the sensing resolution to the second sensing resolution by connecting all of the first and second electrode lines to the second switches. In this case, a touch input is not detected in the entire area of the touch screen 151, and fingerprint information of a finger making contact with the touch screen 151 is detected in the entire area of the touch screen 151.

Meanwhile, the controller 180 may control the touch sensing module 310 to remove grouping (ungrouping) of specific first and second electrode lines that sense an area or region to which the touch input is applied. That is, first and second electrode lines corresponding to one touch point (area) may be connected to the second switches, and first and second electrode lines of the remaining area may be continually connected to the first switches. In this case, fingerprint information may be acquired at the one touch point, and a touch input may be sensed in the remaining area.

Figure 3D:
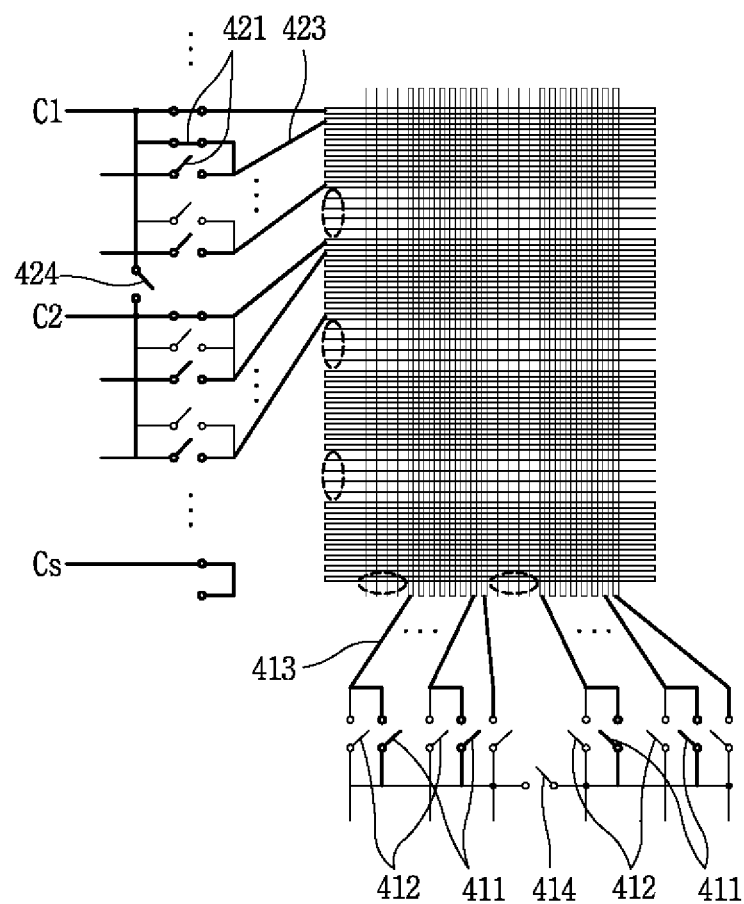
FIG. 3D is a conceptual view illustrating a control method for changing a sensing resolution when a touch input by a stylus pen is applied to a touch screen.

FIG. 3D is a conceptual view illustrating a control method for changing a sensing resolution when a touch input by a stylus pen is applied to a touch screen. Referring to FIG. 3D, the grouping switches 414, 424 are disconnected. As a result, the number of electrode lines to be grouped decreases compared to the fingerprint sensing mode. In the pen input mode, in which a touch input by the stylus pen is applied to the touch screen 151, the touch sensing module 310 has a third sensing resolution, which is higher than the first sensing resolution, and lower than the second sensing resolution.

The controller 180 controls the touch sensing module 310 so as to detect a touch at one of the first to third sensing resolutions based on a touch area and/or pressure sensed by the pressure sensor. Alternatively, the controller 180 may change the sensing resolution of the touch sensing module 310 when a specific function is executed based on a touch applied to one area of screen information displayed on the touch screen 151.

According to the present invention, the controller 180 can change the sensing resolution of each area of the touch sensing module 310. Thus, an additional fingerprint sensor unit is unnecessary. In addition, fingerprint information can be obtained in any area of the touch screen 151, so that fingerprint information can be acquired regardless of a position on the touch screen 151. Accordingly, various functions using a touch input and fingerprint information can be implemented.

Figure 4A:
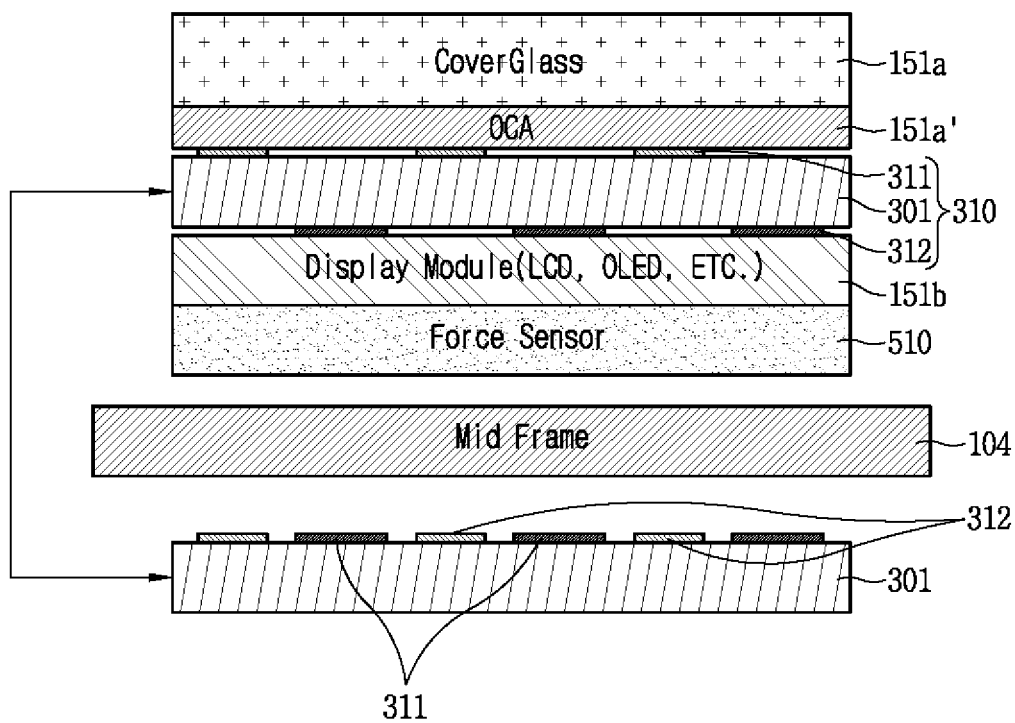
FIGS. 4A and 4B are conceptual views illustrating a configuration of a pressure sensor for sensing pressure of a touch input applied to a touch screen.
Figure 4B:
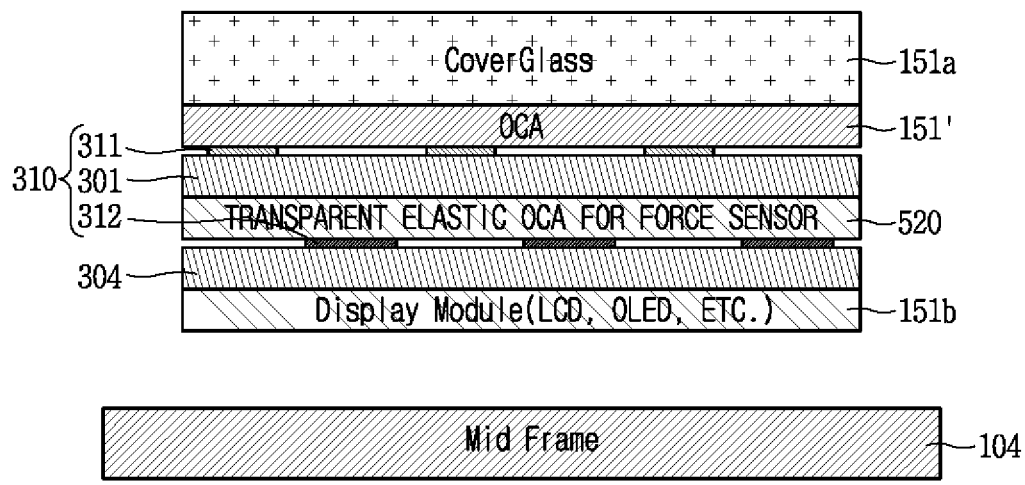

FIGS. 4A and 4B are conceptual views illustrating a configuration of a pressure sensor for sensing pressure of a touch on a touch screen. Referring to FIG. 4A, the cover glass 151a, the adhesive layer 151a', the glass substrate 301, the first and second sensing layers 311, 312, and the display module 151b are disposed. A pressure (force) sensor 510 is formed below the display module 151b.

The pressure sensor 510 is supported by the inner frame of the mobile terminal body 100. Accordingly, the pressure sensor 510 senses touch pressure according to deformation of the cover glass 151a, the glass substrate 301, and the display module 151b when a touch is applied to the touch screen 151.

Meanwhile, the first and second sensing layers 311, 312 may be formed on both surfaces or one surface of the glass substrate 301. When the first and second sensing layers 311, 312 are formed on one surface of the glass substrate 301, the first and second sensing layers 311, 312 are formed so as not to be in contact with each other.

Referring to FIG. 4B, touch pressure is sensed by the first and second sensing layers 311, 312. The first sensing layer 311 is formed on a first glass substrate 301, and the second sensing layer 312 is formed on a second glass substrate 304. A deformation layer 520 is formed between the first glass substrate 301 and the second glass substrate 304. The deformation layer 520 may be made of a transparent elastic OCA such that one region can be elastically deformed in response to touch pressure.

The first and second sensing layers 311, 312 sense a touch input applied to the cover glass 151a. Meanwhile, when the cover glass 151a, the first glass substrate 301, and the deformation layer 520 are deformed in response to touch pressure of the touch input, the first and second sensing layers 311, 312 get closer. As the distance between the first and second sensing layers 311, 312 becomes closer, a capacitance change is increased accordingly. When changes in the capacitance increase while the touch input is being applied, the controller 180 determines that the touch pressure is sensed.

According to the embodiment of the present invention, when pressure greater than a specific reference (criterion) is sensed while the touch input is being applied, the controller 180 detects that a pressed touch including touch pressure is applied. The controller 180 executes a specific function in response to the pressed touch in order to control the touch sensing module 310 to have one of the first to third sensing resolutions.

Figure 5:
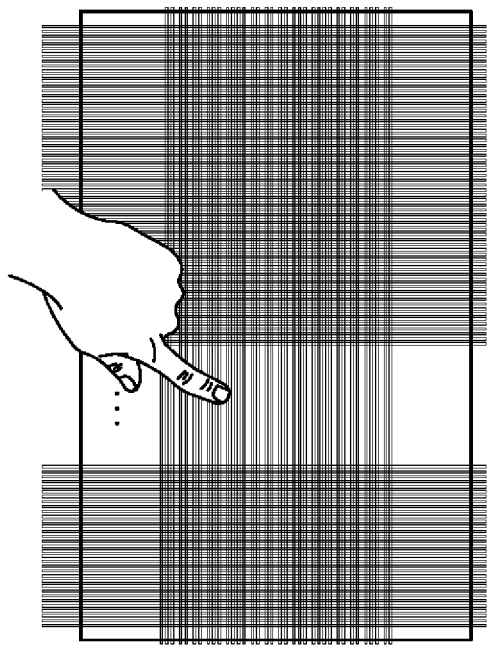
FIG. 5 is a conceptual view illustrating a method of controlling a touch sensing module in a touch receiving mode, a pen input mode, and a fingerprint sensing mode.
Figure 5:
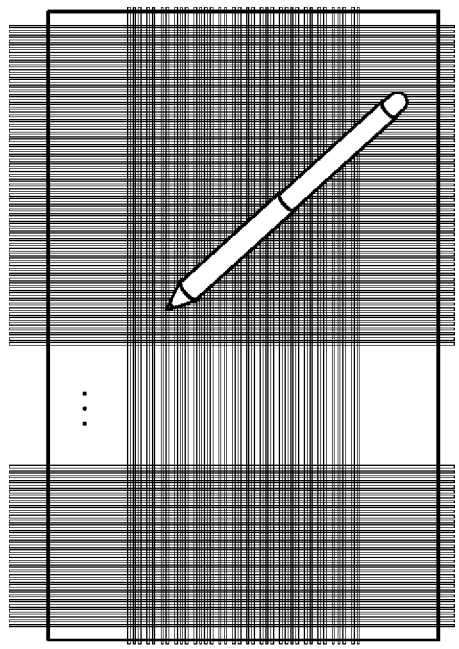
Figure 5:
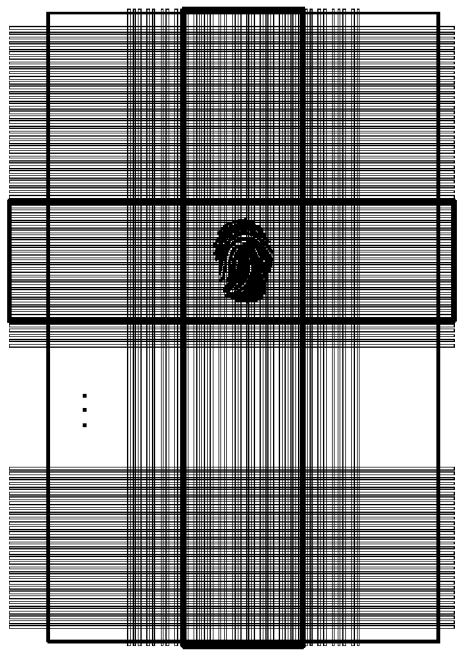

FIG. 5 is a conceptual view illustrating a method for controlling a touch sensing module 310 in a touch receiving mode, a pen input mode, and a fingerprint sensing mode. Referring to FIG. 5, the controller 180 senses a touch at the first sensing resolution in the general touch receiving mode. The first sensing resolution is applied to the entire area of the touch screen 151.

Meanwhile, when a touch input by a stylus pen is sensed, the controller 180 detects the touch at the third sensing resolution. The third sensing resolution is higher than the first sensing resolution. Accordingly, it is possible to more delicately detect a touch by a stylus pen whose touch range is smaller than as of a finger. In this case, the sensing resolution of the entire area of the touch sensing module 310 is also set to the third sensing resolution. The controller 180 may sense touch pressure applied to the touch screen 151, or activate the pen input mode based on a touch range.

When the fingerprint sensing mode is activated, the controller 180 controls the touch sensing module 310 to have the second sensing resolution with respect to one area corresponding to a specific area or the entire area of the touch screen 151. For example, when touch pressure is sensed while a touch input is applied to a specific area on the touch screen 151, the touch sensing module 310 is controlled to have the second sensing resolution only in the specific area. In this case, the remaining area is blocked from detecting the touch input or is controlled to have the first sensing resolution.

Alternatively, when the mode is switched to the fingerprint sensing mode by executing a specific function, the controller 180 may set the sensing resolution of all areas of the touch sensing module 310 corresponding to the entire area of the touch screen 151 to the second sensing resolution. Alternatively, when the sensing resolution of a specific area of the touch sensing module is switched to the second sensing resolution, the controller 180 may ignore a touch input applied to another area of the touch screen (or display unit).

Referring back to FIG. 3A, when the plurality of electrode lines of the touch sensing module 310 have the first and third sensing resolutions, the controller 180 controls the first and the second switches so as not to connect part of the plurality of first and second electrode lines to the circuit board. In more detail, when all of the first and second electrode lines are not connected to the first and second switches, dummy electrode lines are generated. Accordingly, a sensor pinch of the connected electrode lines grouped by the dummy electrode lines is tuned (synchronized or matched).

Figure 6A:
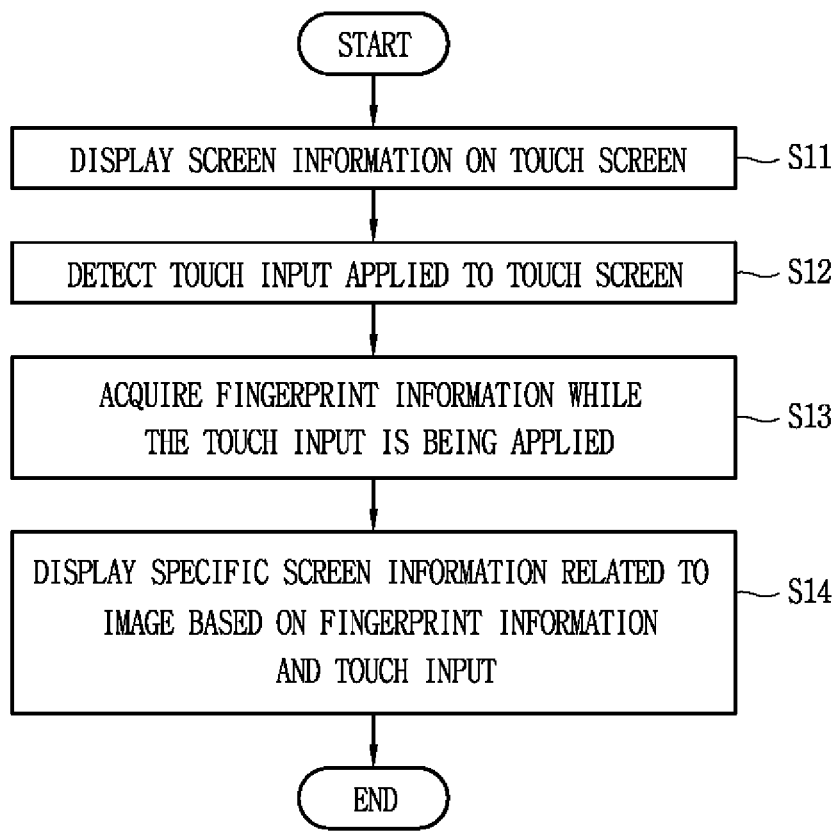
FIG. 6A is a conceptual view illustrating a control method of a mobile terminal in accordance with one embodiment of the present invention.
Figure 6B:
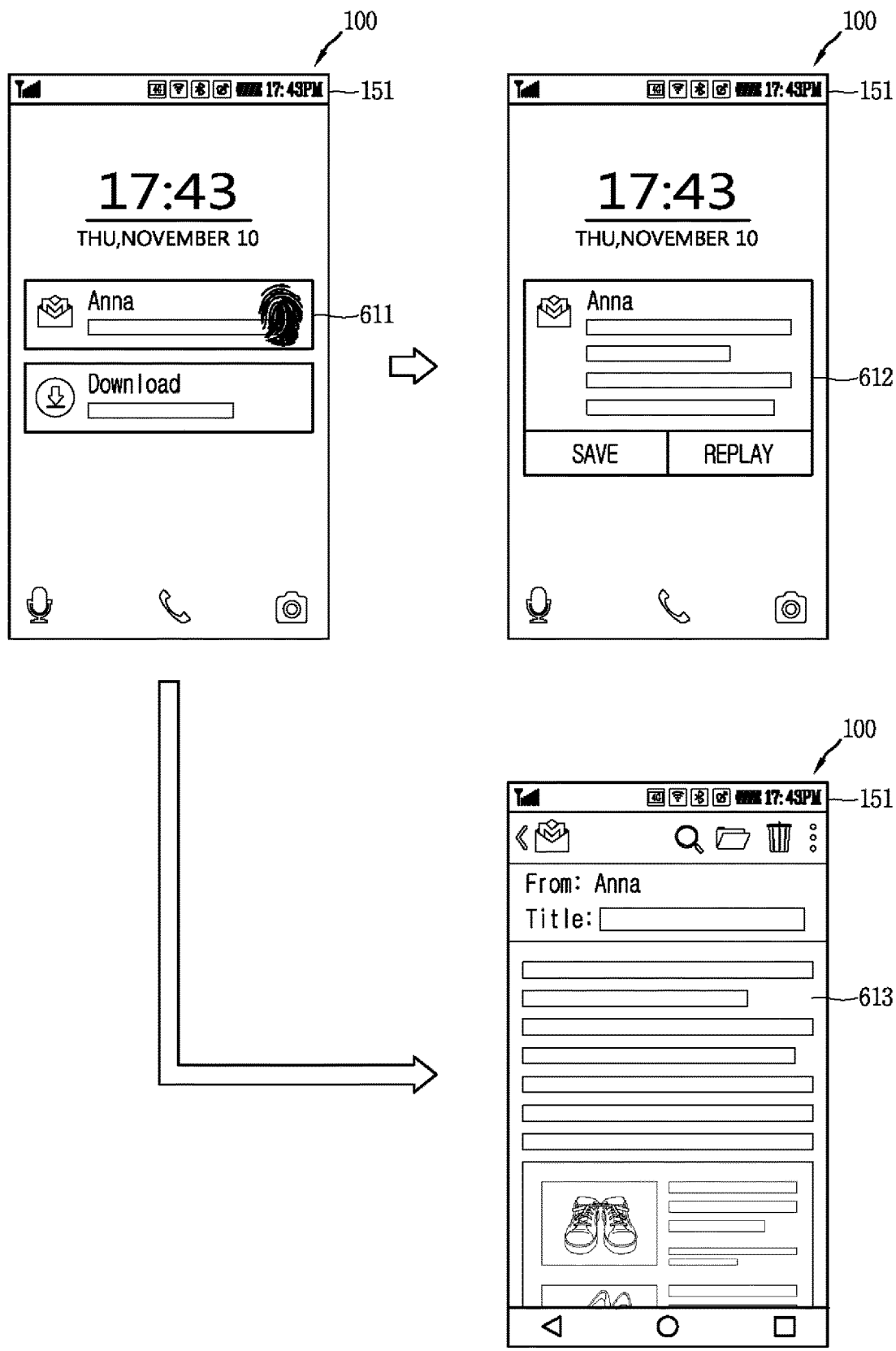
FIG. 6B is a conceptual view illustrating a control method of FIG. 6A.

FIG. 6A is a flowchart illustrating a control method of a mobile terminal in accordance with one embodiment of the present invention. FIG. 6B is a conceptual view illustrating a control method of FIG. 6A. A mobile terminal 100 according to FIGS. 6A and 6B further includes a pressure sensor for sensing touch pressure while a touch input is being applied to the touch screen 151. The touch screen 151 of the mobile terminal 100 displays screen information 611 (S11). The screen information 611 may include specific information of a control command by a user, or may include a notification image 611, which is displayed when information related to an application is received or an event occurs.

When a touch input is applied onto the existing notification image 611, the touch sensing module 310 detects the touch input on the notification image 611 (S12). The controller 180 controls the touch sensing module 310 so as to sense the touch input at the first sensing resolution (S13).

Meanwhile, when pressure of a touch input applied to the notification image 611 is detected by the pressure sensor, the controller 180 controls the touch sensing module 310 to acquire fingerprint information at the second sensing resolution. The controller 180 controls one area corresponding to the notification image 611 or the entire area of the touch sensing module 310 to have the second sensing resolution.

The controller 180 controls the touch screen 151 to display a specific image related to screen information based on the fingerprint information and the touch input when the touch sensing module 310 has the second sensing resolution (S14). In more detail, when touch pressure is sensed while the touch input is being applied to the notification image 611 or the touch is applied for a specific period of time, the controller 180 outputs screen information related to the notification image 611 base on the touch input and the fingerprint information detected by the touch sensing module 310 (S14).

When the fingerprint information is obtained by the touch applied to the notification image 611, the controller 180 displays a pop-up image 612 including information related to the notification image 611 in a form of a pop-up window. The relevant information may be set to be displayed after a user authentication procedure.

Meanwhile, when touch pressure of a touch input applied to the notification image 611 is detected, and the fingerprint information is obtained by the detected pressure of touch input, the controller 180 executes an application related to the notification image 611, and controls the touch screen 151 so as to display the application execution screen 613.

Figure 6C:
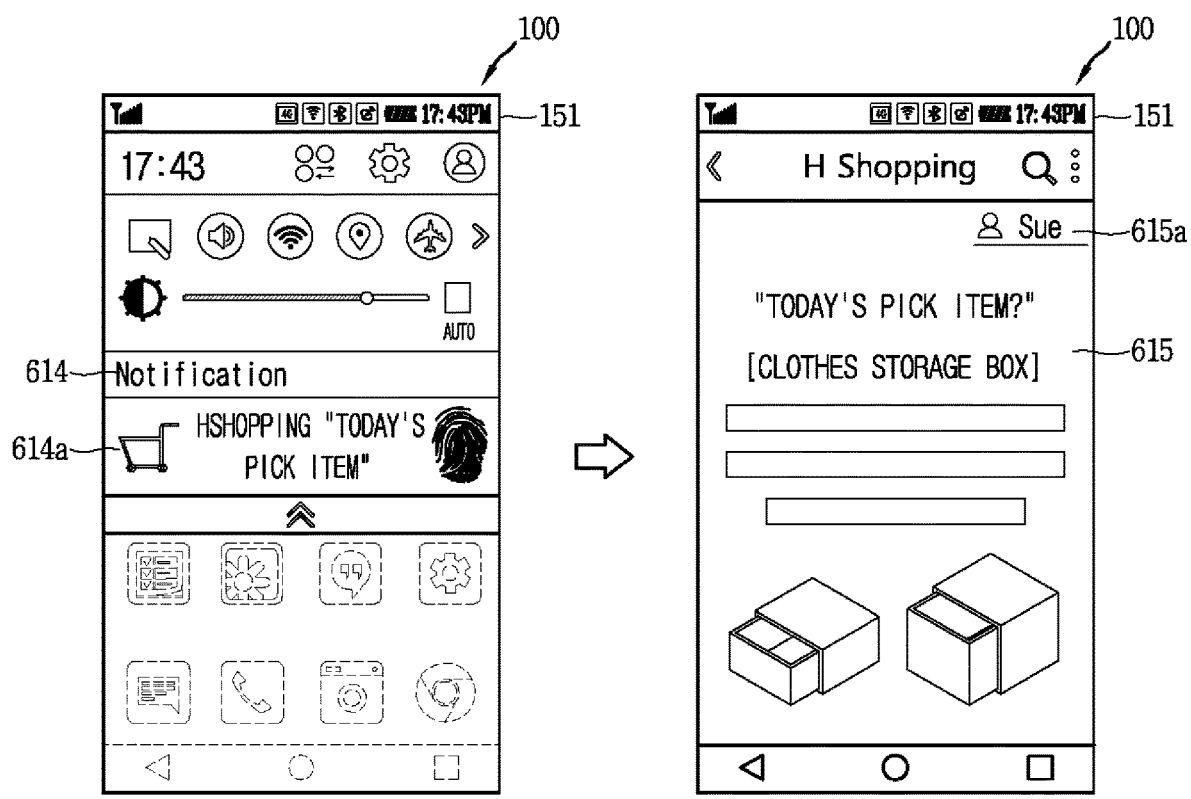
FIGS. 6C and 6D are conceptual views illustrating a control method of a mobile terminal in accordance with another embodiment of the present invention.
Figure 6D:
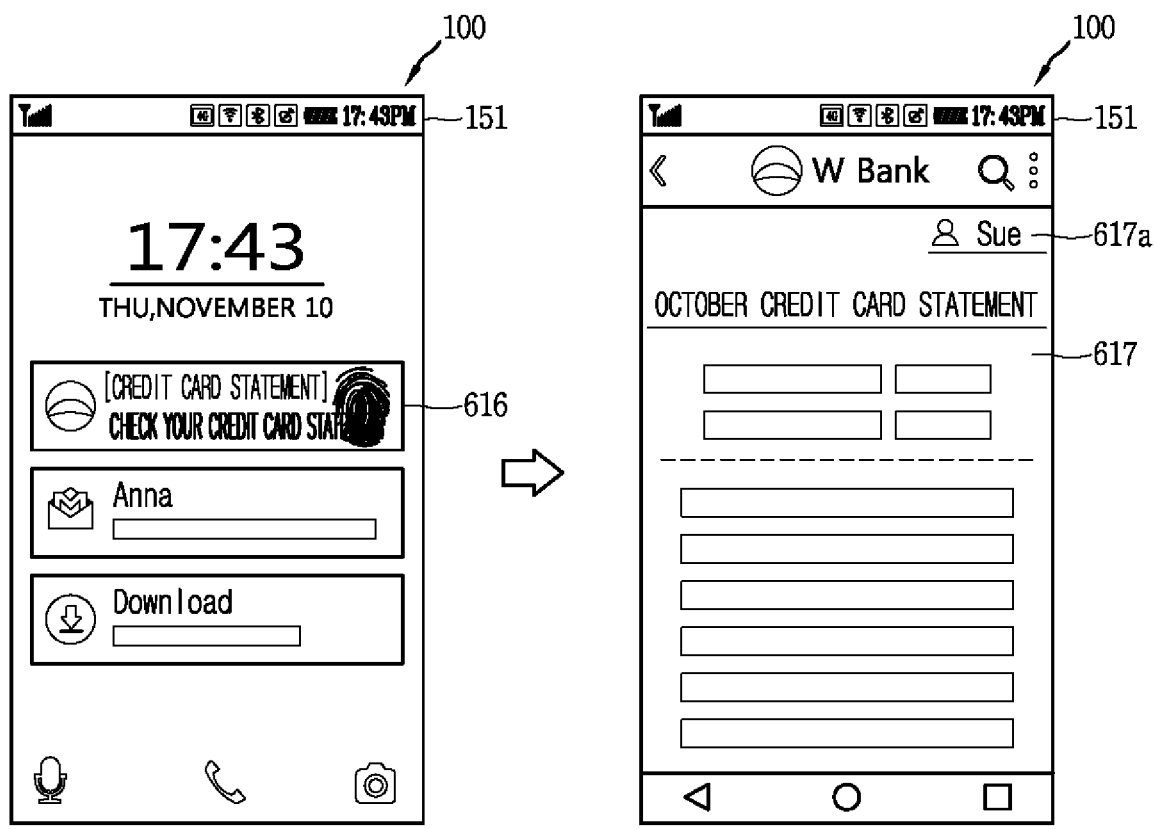

FIGS. 6C and 6D are conceptual views illustrating a control method of a mobile terminal in accordance with another embodiment of the present invention. Referring to FIG. 6C, the touch screen 151 displays notification screen information 614 including notification message information, and operating (execution) information in response to a specific touch input.

When a touch input is applied to the notification image 614a related to a specific application among the notification screen information 614, the controller 180 outputs additional information related to the notification image 614a or an application execution screen related to the application. The notification image 614a may correspond to a push alarm (notification), or the like of the application.

Meanwhile, when a touch input including touch pressure is applied to the notification image 614a, the controller 180 changes the sensing resolution of at least one area of the touch sensing module 310 to the second sensing resolution for acquiring fingerprint information.

The controller 180 proceeds with a user authentication procedure for accessing to the application based on fingerprint information acquired by the touch input. The controller 180 may log in to the application based on the fingerprint information. Accordingly, the touch screen 151 displays an execution screen 615 of the application in a logged-in state. The execution screen 615 displays an indicator 615a indicating that the application is logged in based on the fingerprint information.

Although not illustrated in the drawings, when a login attempt based on the acquired fingerprint information fails, the controller 180 may control the touch screen 151 to display an alarm window notifying that the login attempt has failed, or to display an execution screen of the application in a non-logged in state.

Referring to FIG. 6D, when a notification image 616 of a specific application is displayed in a screen lock state, the controller 180 controls the touch sensing module 310 to have the second sensing resolution when touch pressure is detected while a touch input is being applied to the notification image 616.

The controller 180 executes an application corresponding to the notification image 616 based on the touch input and the fingerprint information, and performs a user authentication procedure. When the user authentication procedure based on the fingerprint information is completed, the touch screen 151 is controlled to display an execution screen 617 corresponding to completion of the authentication procedure (a logged-in state). The execution screen 617 may include an indicator 617a indicating the completion of the authentication procedure.

According to these embodiments, a user can perform a function without an additional authentication procedure since fingerprint information is also acquired while applying a touch to an image displayed on any position of the touch screen 151 to generate a control command.

FIGS. 7A to 7D are conceptual views illustrating a control method for executing a specific function using fingerprint information.

Figure 7A:
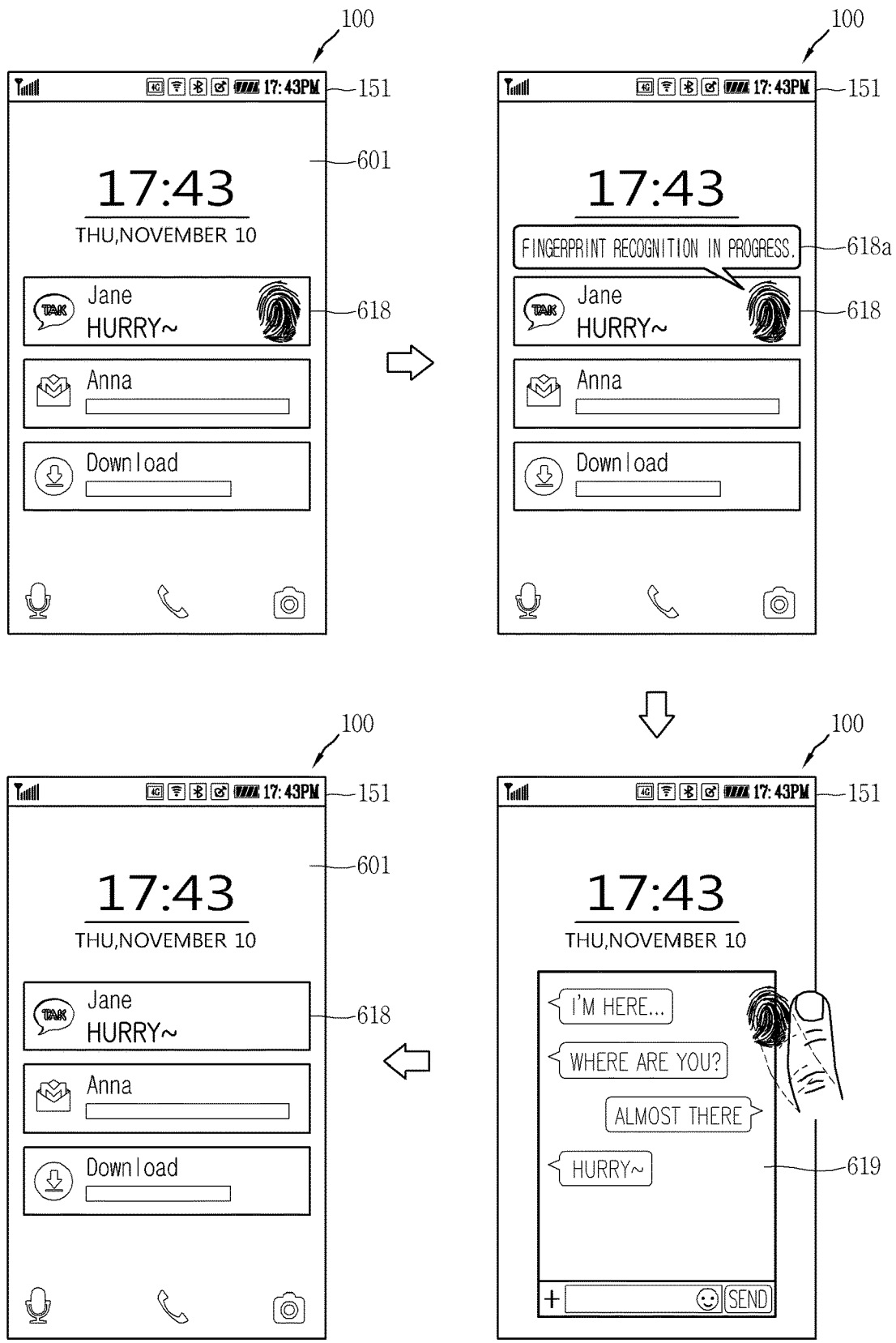
FIGS. 7A to 7D are conceptual views illustrating a control method for executing a specific function using fingerprint information.

Referring to FIG. 7A, when a specific event is received in a screen lock state, the touch screen 151 displays a notification image 618 related to the event. When touch pressure is detected while a touch input is applied to the notification image 618, the controller 180 controls the touch sensing module 310 to acquire fingerprint information.

The controller 180 controls the touch sensing module 310 to acquire the fingerprint information while the touch input is applied to the notification image 618. The touch screen 151 displays a notification window 618a notifying that fingerprint recognition is in progress on an area adjacent to the notification image 618 while the fingerprint information is being acquired.

The controller 180 performs a user authentication procedure based on the fingerprint information. The controller 180 controls the touch screen 151 to display an information window (info window) 619 related to the notification image 618 when the authentication procedure is performed. The notification image 618 and the related information window 619 may be displayed on a lock screen in a screen lock state of the mobile terminal.

When the touch on the touch screen 151 is released, the relevant information window 619 disappears from the touch screen 151, and the notification image 618 is displayed on the lock screen again.

In other words, the relevant information window is displayed only when a verified user applies a touch to the touch screen 151 after completing the user authentication through the fingerprint information. Accordingly, personal information can be kept safe and secure, and a user can get desired information easily without additional or separate steps for unlocking and user authentication.

Figure 7B:
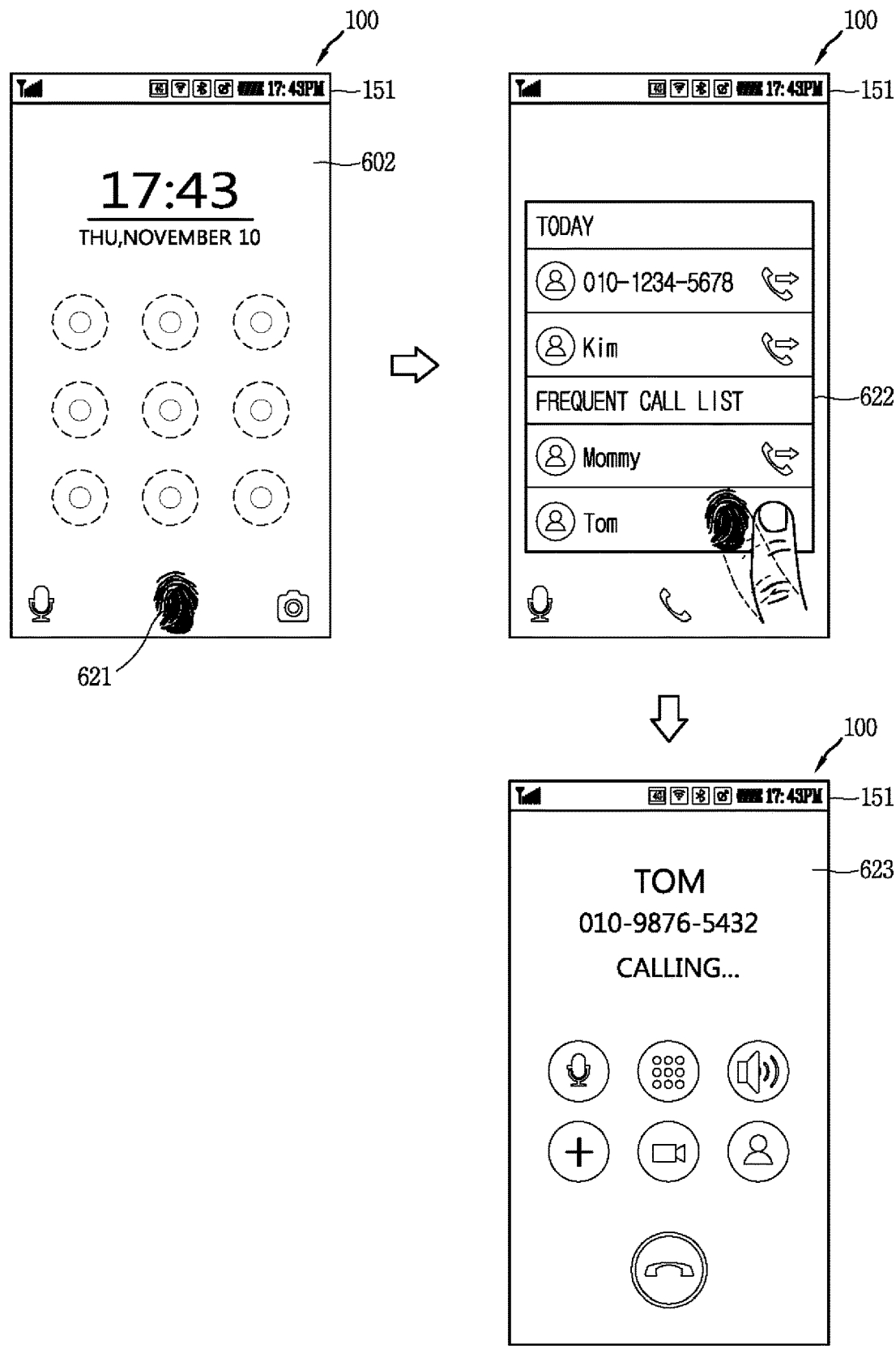

Referring to FIG. 7B, a lock screen 602 is displayed when the mobile terminal 100 is in a lock state. The lock screen 602 may include a graphic image, or the like for entering a password to unlock. In addition, the lock screen 602 may include at least one icon 621 for receiving a touch input so as to quickly execute a specific application.

When a touch input is applied to the icon 621, the controller 180 outputs preset information. When fingerprint information of the touch input applied to the icon 621 is acquired, the controller 180 controls the touch screen 151 to display additional information related to the fingerprint information.

For example, the icon 621 may correspond to a graphic image for making an emergency call to a specific number. When a touch input is applied to the icon 621, an emergency call function for making a phone call to a specific emergency number is executed without unlocking.

When pressure of the touch input applied to the icon 621 is detected, and fingerprint information is acquired by the touch input, the controller 180 provides an additional phone number related to a user other than the emergency number. Alternatively, even when the touch pressure is not detected, the controller 180 may control the touch sensing module 310 to acquire fingerprint information when a touch input is sensed for a specific period of time.

The controller 180 controls the touch screen 151 to display contacts information 622 related to the user when user authentication based on the fingerprint information is completed.

Contacts information 622 is displayed on the lock screen 602. The contacts information 622 may correspond to a list of recent calls made by the user, a preset favorite list and/or an emergency contact set by the user, etc.

The controller 180 executes a call-making function to make a call to a selected contact number based on a touch input applied to the contacts information 622. When the call-making function is executed, an execution screen 623 related to the call-making function is displayed on the touch screen 151.

The touch screen 151 may change the lock screen 602 to the execution screen 623, or display the execution screen 623 on the lock screen 602 in a form of a pop-up window.

Accordingly, the call-making function can be executed more quickly since an additional step for unlocking or making a phone call is not needed.

Figure 7C:
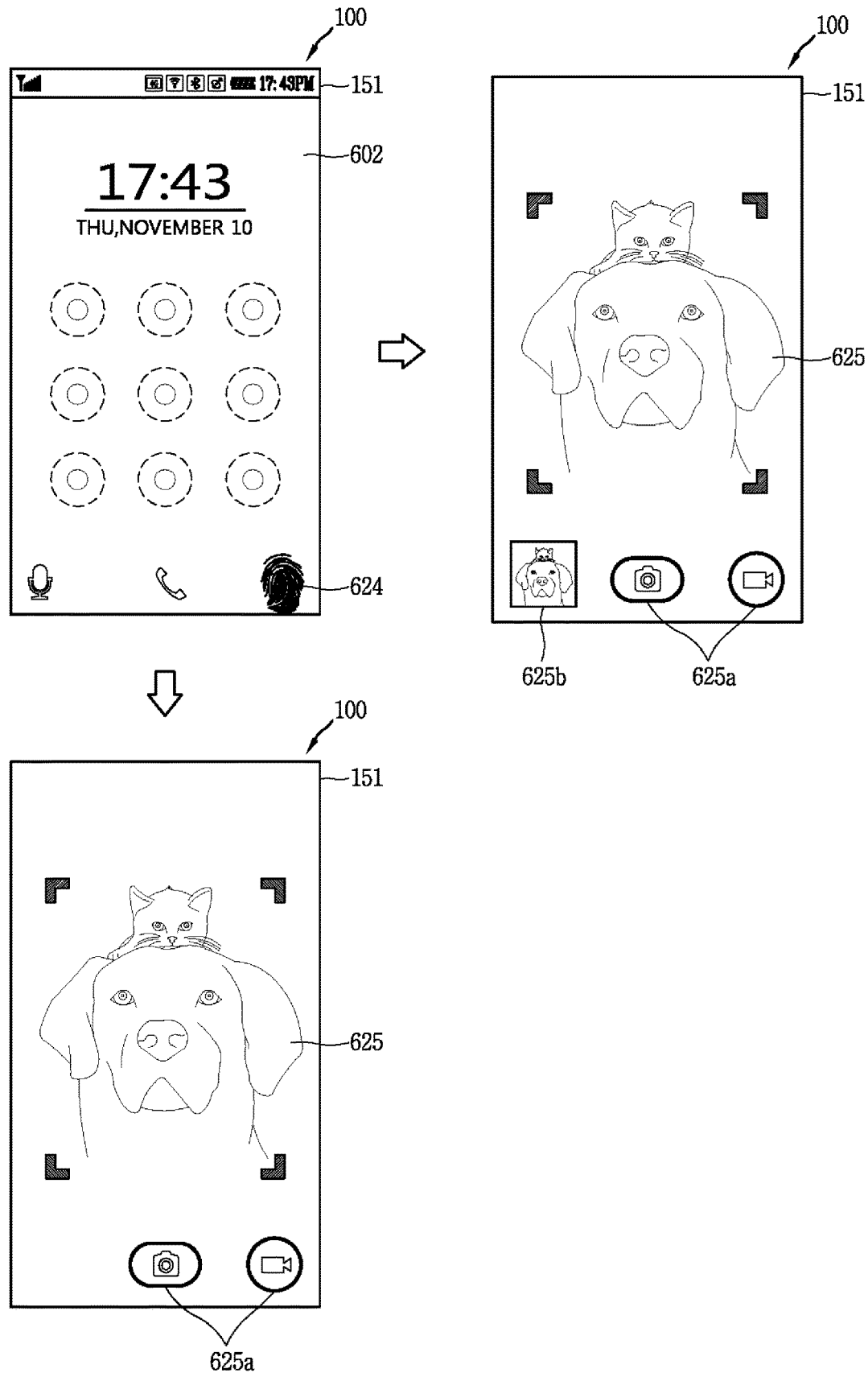

Referring to FIG. 7C, the lock screen 602 includes an icon 624 for activating a camera 121, and receiving a touch input to execute a photographing function. When a touch input on the icon 624 is received, the controller 180 displays a preview image 625 obtained through the camera 121 on the touch screen 151. However, another picture stored in the memory 170 may not be activated by just applying a touch input to the icon 624.

The preview image 625 only includes a photographing icon 625a for shooting an image or a video through the camera 121. When an image, or the like is photographed and stored by the photographing icon 625a, the relevant preview image may be displayed.

The controller 180 displays the preview image 625 on the touch screen 151 when fingerprint information is obtained by pressure of the touch input applied to the icon 624. Alternatively, even when the touch pressure is not detected, the controller 180 may control the touch sensing module 310 to acquire fingerprint information when a touch input is sensed for a specific period of time.

In addition, the preview image 625 displays a graphic image 625b for displaying images stored in the memory 170. When the touch input is applied to the preview image 625, prestored images may be displayed on the touch screen 151.

In other words, the screen lock state may be unlocked while a touch input applied to an icon for activating the camera 121 is being received.

Although not specifically illustrated in the drawings, when pressure of a touch input applied to the photographing icon 625a is detected, a photographed image or picture (or video) may be stored in a locked state.

Figure 7D:
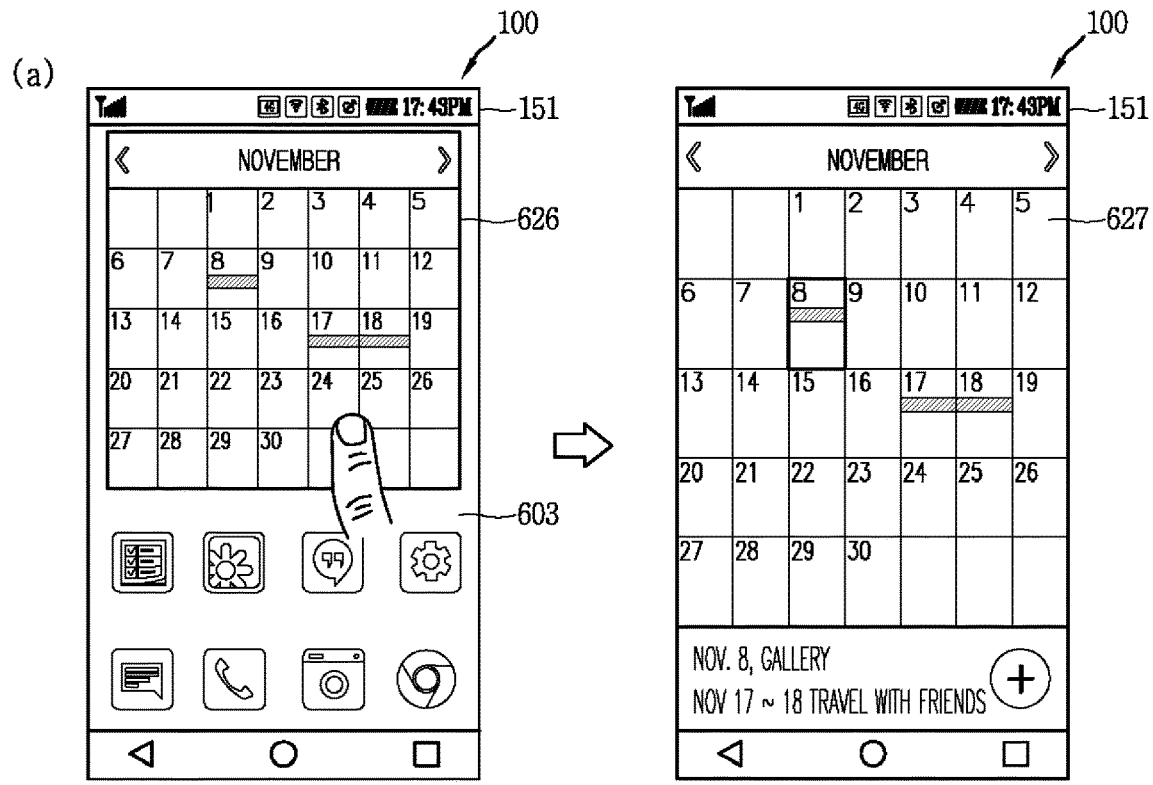
Figure 7D:
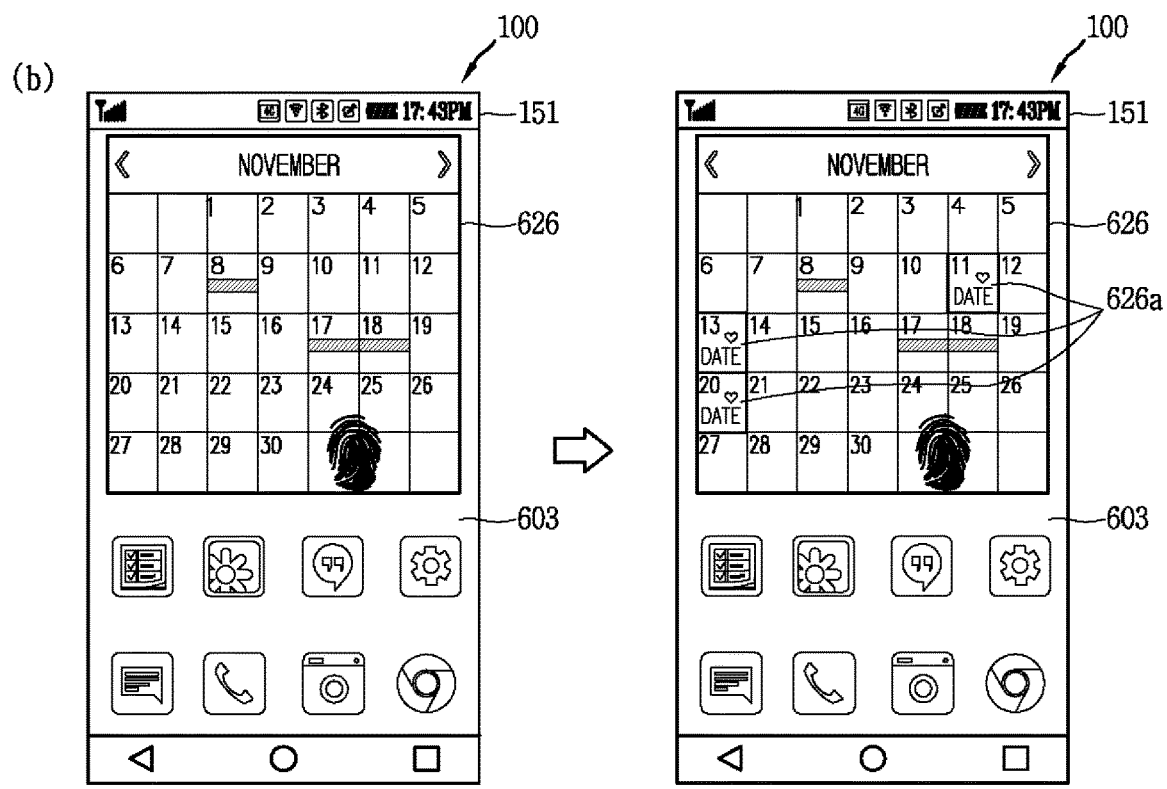

Referring to FIG. 7D, the touch screen 151 displays a home screen page 603 including at least one icon. A widget 626 of a calendar application that records data by date is displayed on the home screen page 603. Referring to (a) of FIG. 7D, the controller 180 outputs an execution screen 627 of the calendar application when a touch input is applied to the widget 626 of the calendar application.

Referring to (b) of FIG. 7D, when fingerprint information is acquired while the touch input is being applied to the widget 626, the controller 180 controls the touch screen 151 to display hidden additional information 626a on the widget 626. The additional information 626a refers to stored information locked by a user. The touch screen 151 may display the additional information 626a while the touch input is being continuously applied.

The controller 180 controls the touch sensing module 310 so as to acquire fingerprint information when a touch input is continuously applied to the widget 626 for a specific period of time, or pressure of a touch input is detected.

Figure 8:
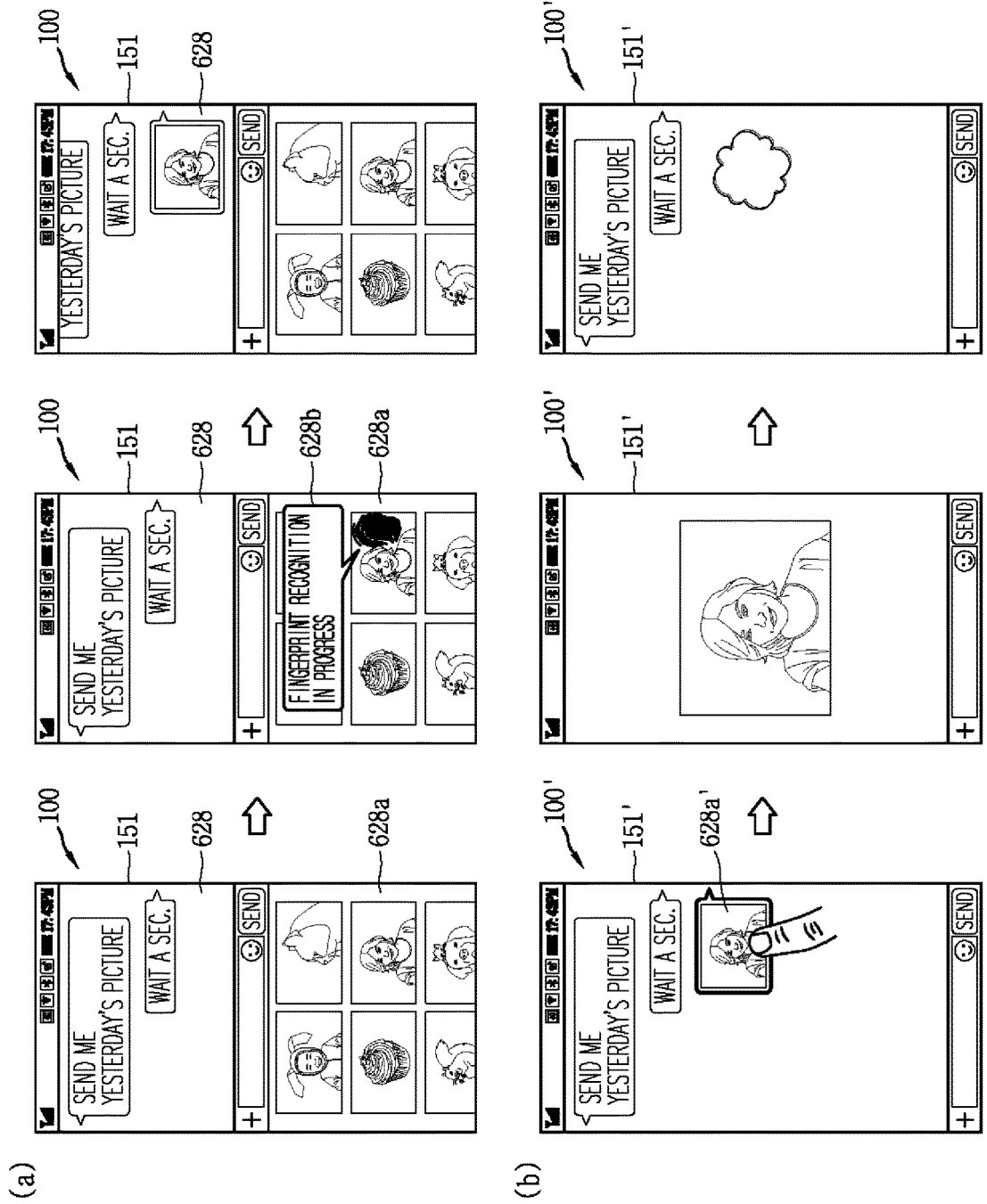
FIG. 8 is a conceptual view illustrating a control method for adding setting information to a specific function when fingerprint information is acquired.

FIG. 8 is a conceptual view illustrating a control method for adding setting information to a specific function when fingerprint information is acquired.

Referring to FIG. 8, the touch screen 151 displays a message screen 628 for transmitting a content 628a to an external device 100a. The message screen 628 displays at least one of contents 628a and 628b based on a specific control command. The controller 180 may transmit the content 628a to the external device based on a touch input applied to the content 628a.

However, when pressure of a touch input applied to the content 628a is detected, the controller 180 acquires fingerprint information while the touch input is being applied. The controller 180 selects the touched content 628a and transmits the selected content 628a to the external device. However, the controller 180 controls the wireless communication unit 110 so that a specific function is included in the content 628a upon transmitting based on the fingerprint information.

(b) of FIG. 8 illustrates an external device 100a to which the content 628a is transferred. A received content 628a' is displayed on a touch screen 151' of the external device. The touch screen 151' may display the content 628a' as a full screen when a touch is applied to the received content 628a.

However, the controller 180 controls the touch screen 151' so that the received content 628a' disappears after a predetermined time. That is, when the fingerprint information is acquired, the controller 180 of the mobile terminal 100 may set a limit for displaying a content after passing a predetermined time before transmitting the content 628a to the external device 100a.

Accordingly, a user can add a desired option based on fingerprint information acquired upon touching to execute a function without any additional step for setting a specific function.

Figure 9A:
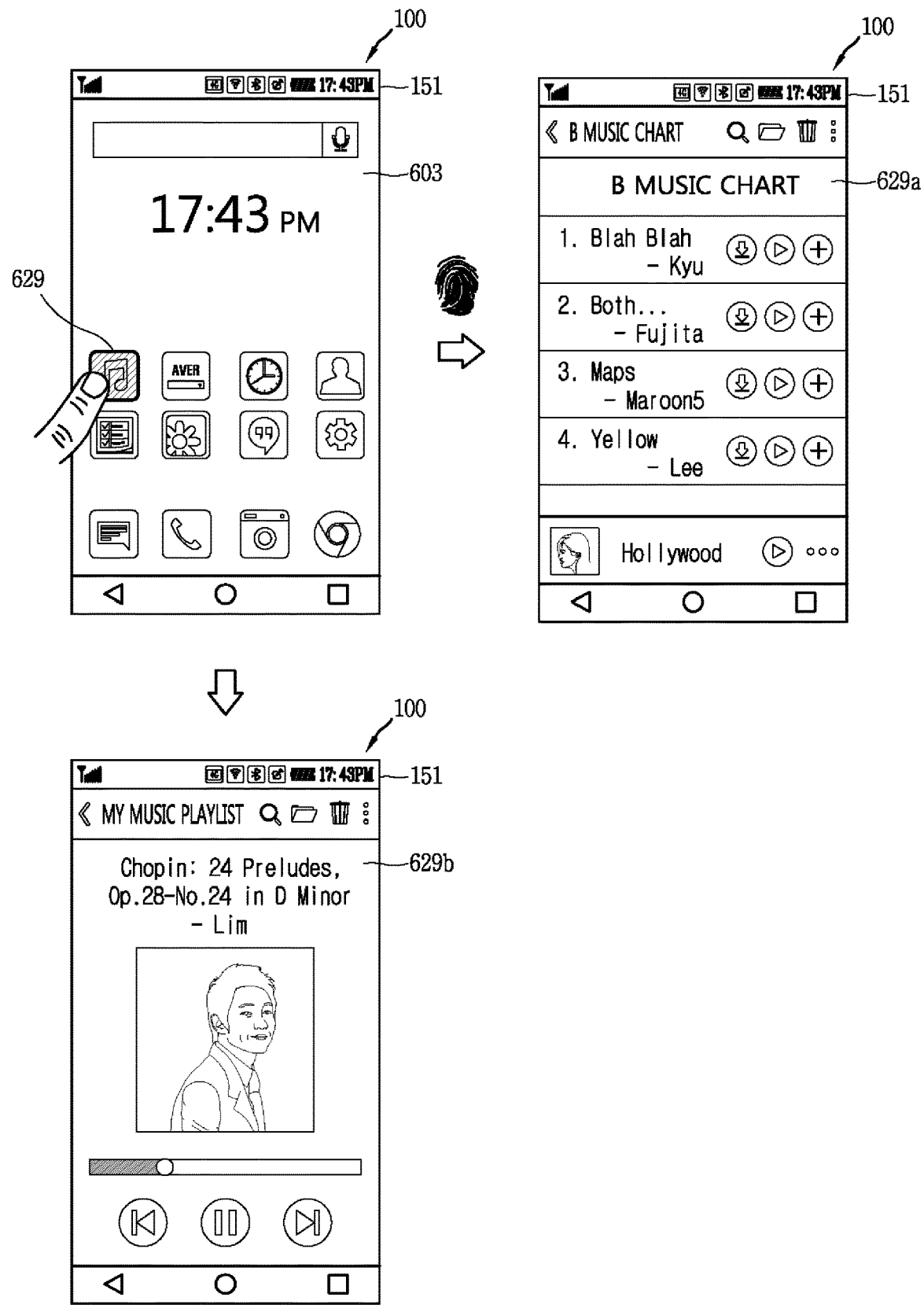
FIGS. 9A to 9C are conceptual views illustrating a control method for executing different functions based on acquired fingerprint information, in accordance with another embodiment of the present invention.
Figure 9B:
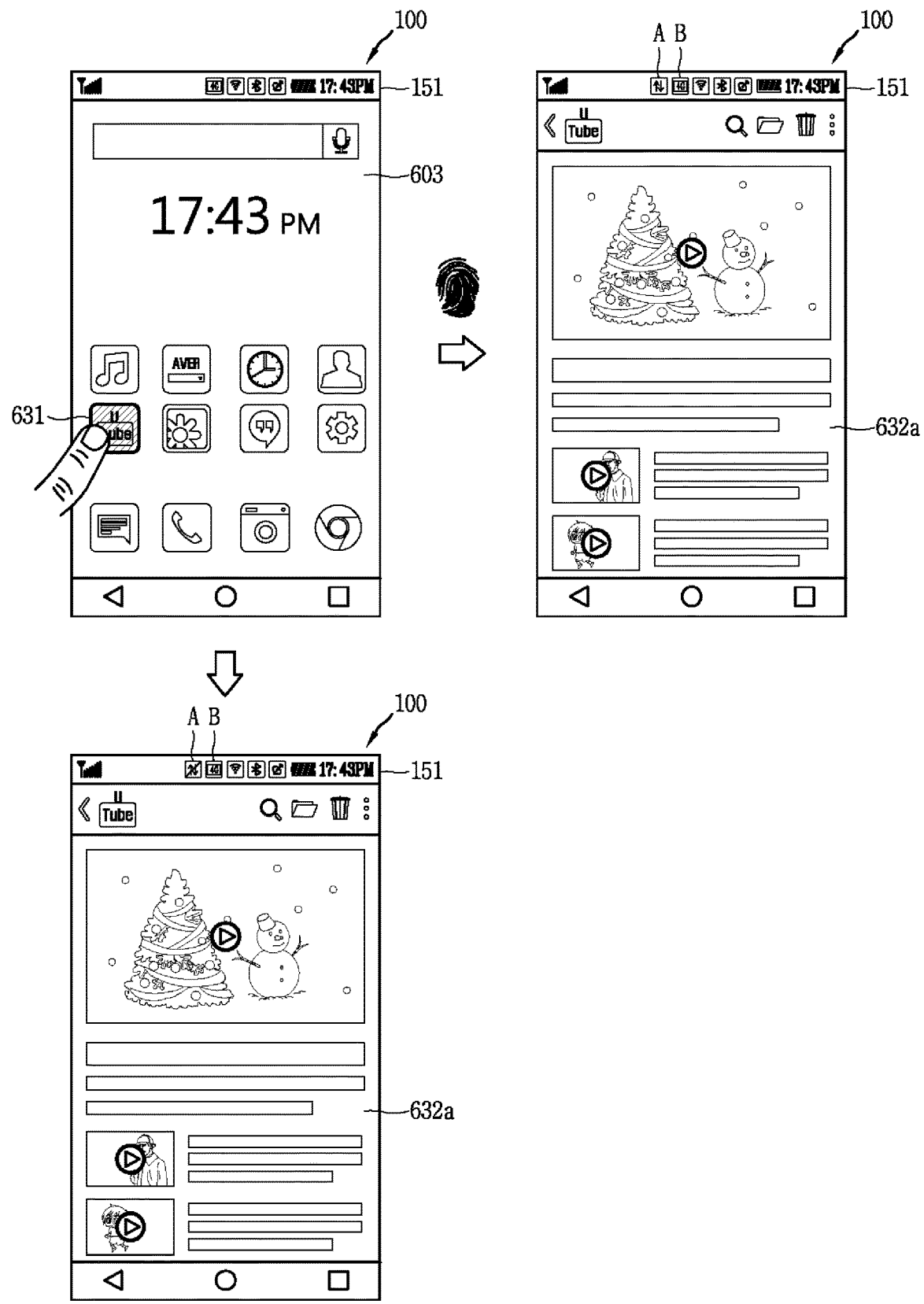
Figure 9C:
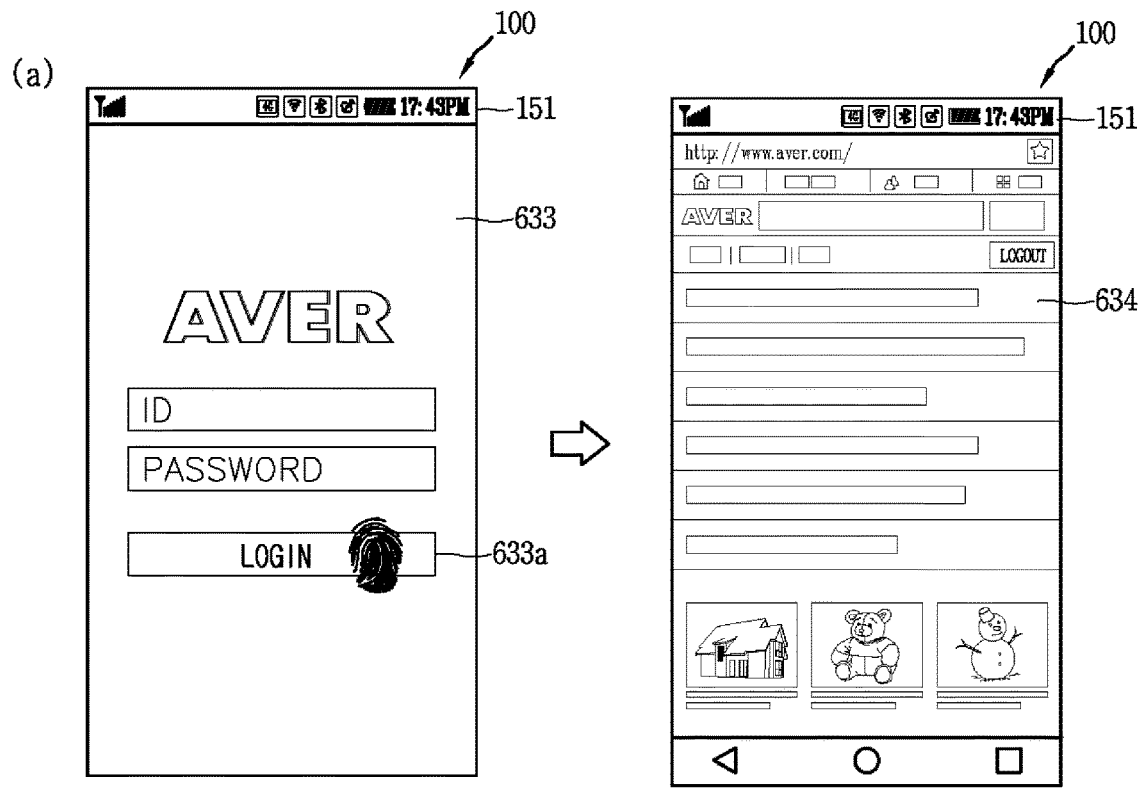
Figure 9C:
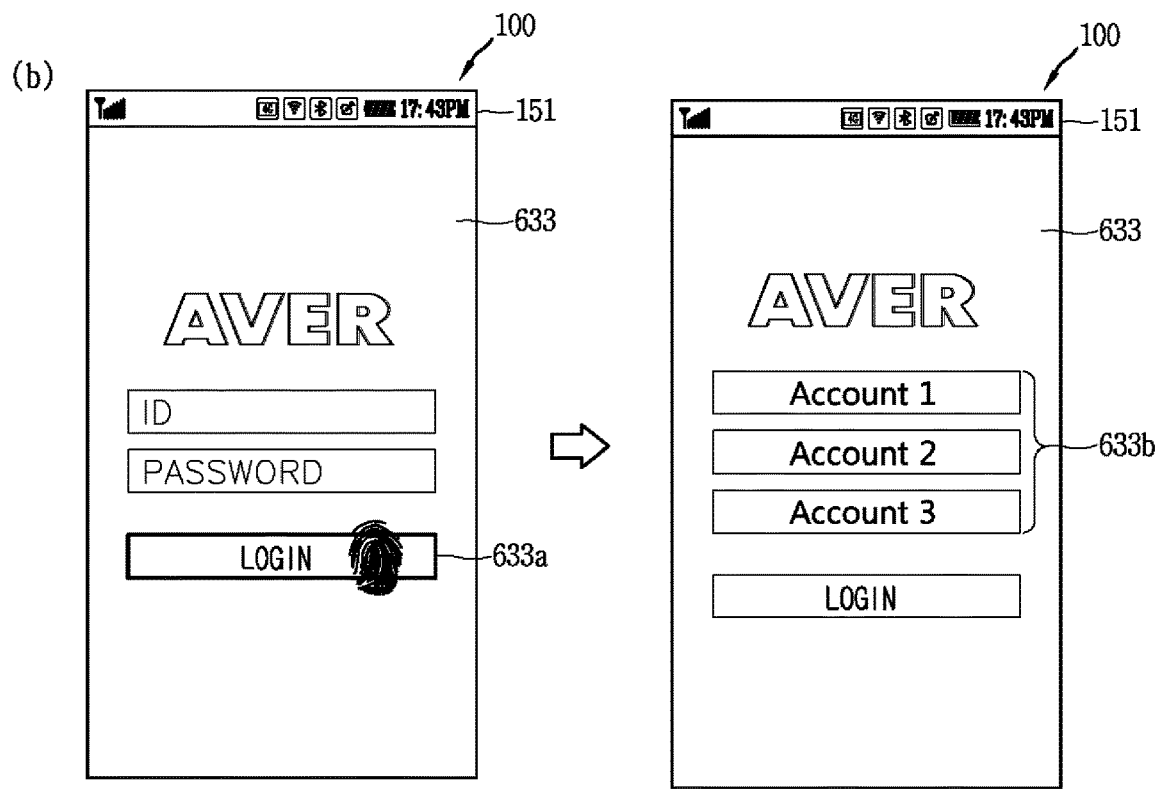

FIGS. 9A to 9C are conceptual views illustrating a control method for executing different functions based on acquired fingerprint information, in accordance with another embodiment of the present invention.

Referring to FIG. 9A, the touch screen 151 displays an icon 629 included in a home screen page 603. The icon 629 may correspond to a music play icon of an application.

When fingerprint information is acquired while a touch input is being applied to the icon, the controller 180 executes a first function of receiving music information while executing a wireless communication function. For example, the first function 629a may correspond to wireless communication data consumption.

Meanwhile, when fingerprint information is not acquired while a touch input is being applied to the icon, or when a user authentication procedure is not completed based on the fingerprint information, the controller 180 executes a second function related to the first function instead of executing the wireless communication function.

The second function 629b may correspond to displaying music information stored in the memory 170 of the mobile terminal 100. Alternatively, when the fingerprint information is obtained but the user authentication is failed, the controller 180 may only display the music information stored in the memory 170, or may control to play music using Wi-Fi (communication) instead of using data.

Although not specifically illustrated in the drawings, the controller 180 may control the touch screen 151 to display a confirmation window for checking which communication method is used to execute a function when the fingerprint information is acquired.

In other words, the controller 180 determines whether a function is executed by the user's intention based on the obtained fingerprint information, and executes a function with a lower risk as an alternative.

Referring to FIG. 9B, the home screen page 603 includes an icon 631 of a specific application. The controller 180 may obtain fingerprint information by the touch sensing module 310 while a touch input is being applied to the icon 631 for executing the application. The controller 180 may change the sensing resolution of the touch sensing module 310 to acquire the fingerprint information when touch pressure is sensed while the touch input is being applied to the icon 631.

The controller 180 executes an application corresponding to the icon 631 based on the touch input. When executing the wireless communication unit 110 is required for the application execution, the controller 180 may change the wireless communication state based on whether the fingerprint information is acquired.

For example, when the fingerprint information is acquired, the controller 180 executes the application using a cellular data communication (A) method. Alternatively, when user authentication based on the fingerprint information is failed and acquiring the fingerprint information is failed, the controller 180 blocks the cellular data communication (A), and uses Wi-Fi (B) (communication) to execute the application.

In other words, when a fee is charged for using a communication method of executing an application, the controller 180 may select the communication method according to whether user's fingerprint information is acquired.

Referring to FIG. 9C, the touch screen 151 displays an execution screen 633 of a specific application. The execution screen may correspond to a login screen. The execution screen 633 includes an input window for entering a user ID and a password to login, and a graphic image 633a for applying a control command. After information or data is entered into the input window, the controller 180 performs a user authentication procedure based on a touch applied to the graphic image 633a, and displays next screen information 634.

Meanwhile, the controller 180 acquires fingerprint information while the touch input is being applied to the graphic image 633a in a state where no information is entered into the input window. The controller 180 may control the touch sensing module 310 to acquire the fingerprint information when pressure of the touch input is sensed.

Referring to (a) of FIG. 9C, the controller 180 performs a user authentication procedure based on the fingerprint information. When the fingerprint information matches with a prestored user's fingerprint, the controller 180 controls the touch screen 151 to display the next screen information 634.

Referring to (b) of FIG. 9C, the controller 180 controls the touch screen 151 to display registered login information 633b based on a touch input and fingerprint information applied to the graphic image 633a.

The login information 633b includes a plurality of login information stored in the mobile terminal 100, and the plurality of login information may be verified by the acquired fingerprint information. Accordingly, the user may perform a login procedure with one of the plurality of login information.

Figure 10A:
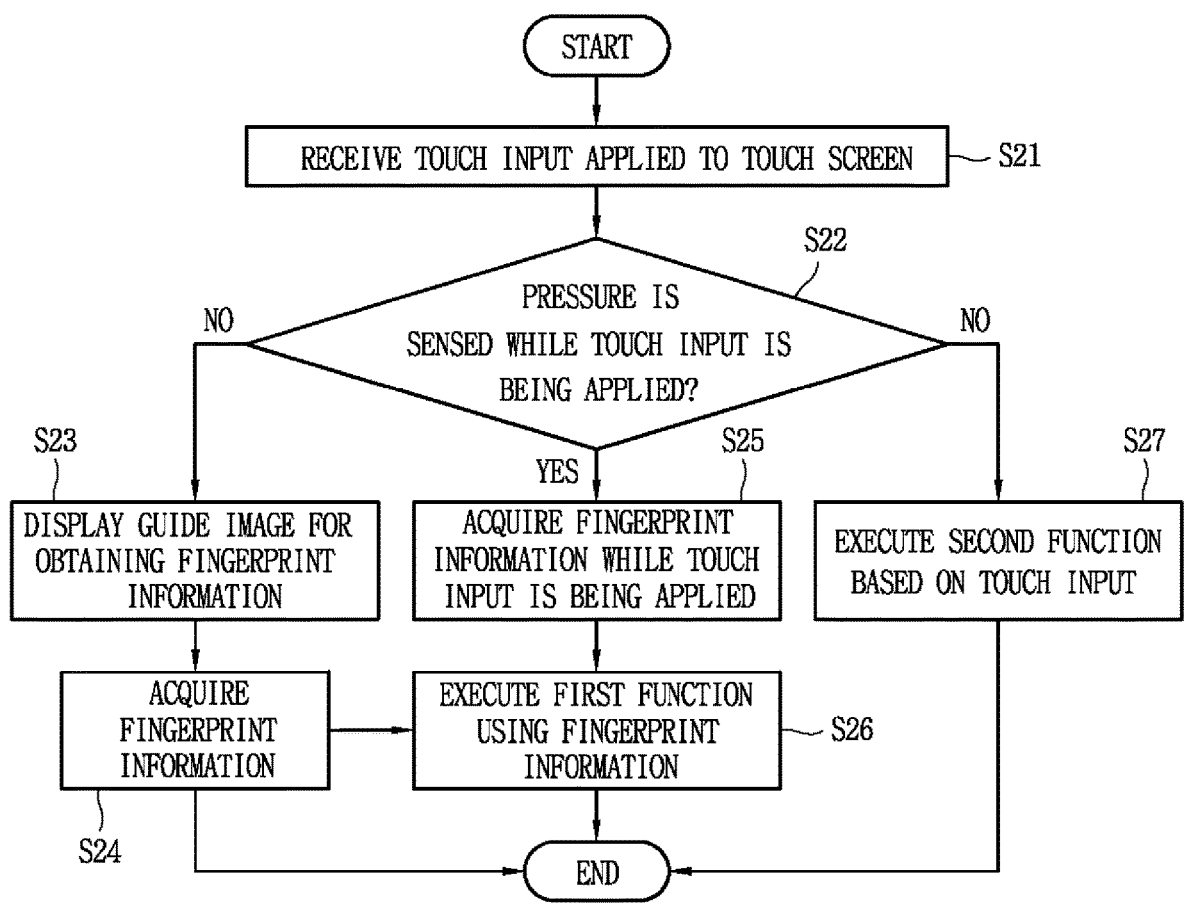
FIG. 10A is a flowchart illustrating a control method of a mobile terminal using fingerprint information, in accordance with one embodiment of the present invention.
Figure 10B:
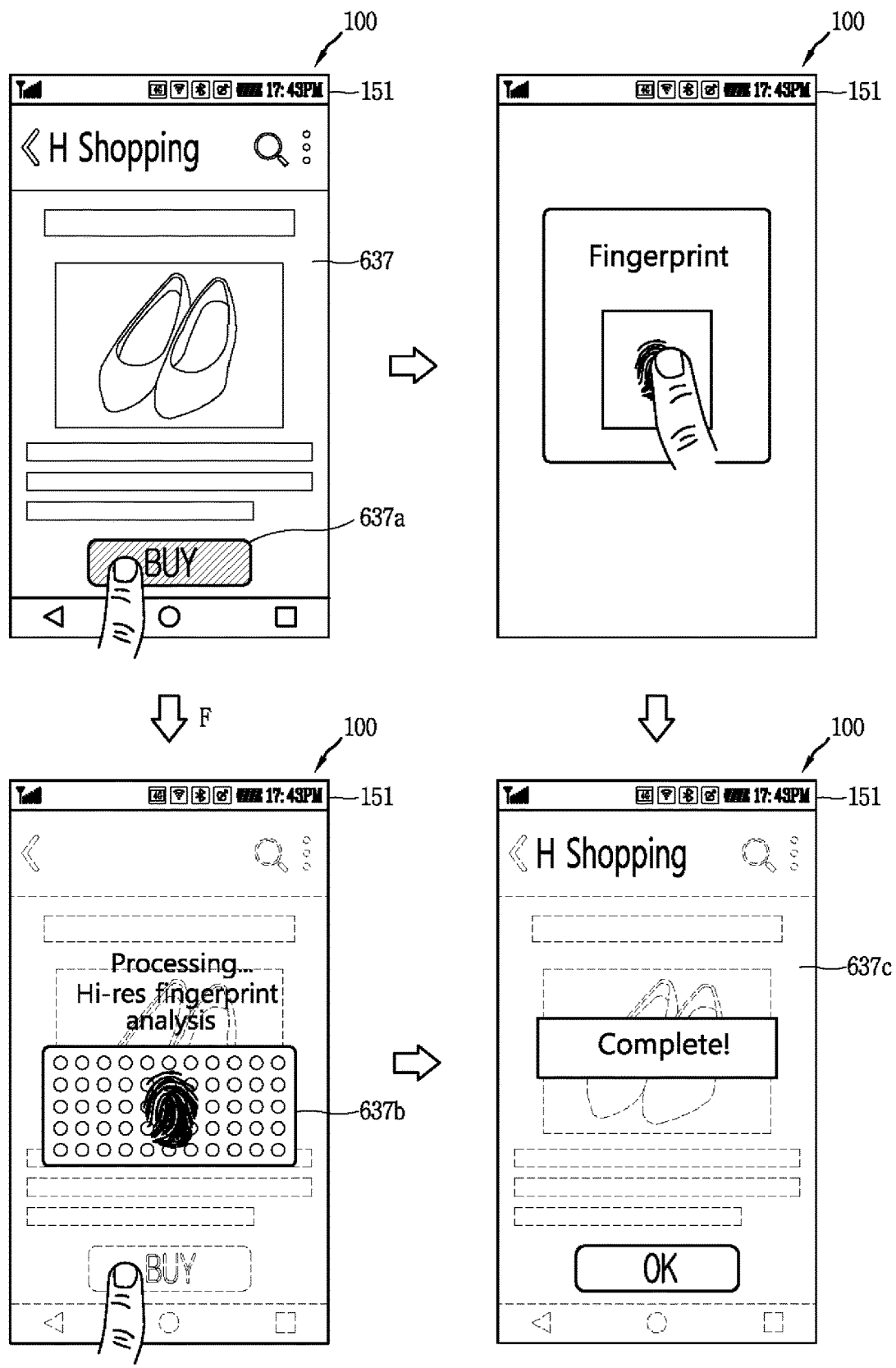
FIG. 10B is a conceptual view illustrating a control method of FIG. 10A.

FIG. 10A is a flowchart illustrating a control method a mobile terminal using fingerprint information, in accordance with one embodiment of the present invention, and FIG. 10B is a conceptual view illustrating a control method of FIG. 10A.

Referring to FIG. 10A, a touch input applied to the touch screen 151 is received (S21). The controller 180 determines whether touch pressure applied to the touch screen 151 is sensed while the touch input is being applied (S22).

Referring to FIG. 10B, the touch screen 151 displays screen information 637 including a graphic image 637a for applying a control command to execute a first function. For example, the screen information 637 may correspond to a shopping mall homepage including a 'BUY' icon for purchasing an item.

The controller 180 determines whether pressure of a touch input applied to the graphic image 637a is sensed. When the touch pressure is not detected, the controller 180 displays a guide image for acquiring fingerprint information. The controller 180 controls the touch sensing module 310 to change its sensing resolution to the second sensing resolution in order to obtain the fingerprint information. Accordingly, the fingerprint information may be acquired based on the touch of the finger (S24).

The first function is executed based on the fingerprint information (S26), and the touch screen 151 is controlled to display an execution completion screen 637c of the function.

Meanwhile, when the fingerprint information is not acquired, the controller 180 executes a second function different from the first function (S27). Although not illustrated in the drawings, the controller 180 may control to execute another function based on a touch input applied to the graphic image 637a.

When the fingerprint information is acquired while the touch input is being applied (S25), the controller 180 executes the first function using the fingerprint information (S26). Referring to FIG. 10B, when touch pressure (F) is sensed while a touch input is being applied to the graphic image 637a, the controller 180 controls the touch sensing module 310 so as to acquire fingerprint information.

When the fingerprint information is obtained, the controller 180 compares it with the prestored fingerprint information to proceed with user authentication, and the touch screen 151 displays a notification image 637b. The controller 180 executes the first function after completing the user authentication procedure. The notification image 637b may be displayed on the screen information 637 while the touch is being applied to the graphic image 637a.

Figure 10C:
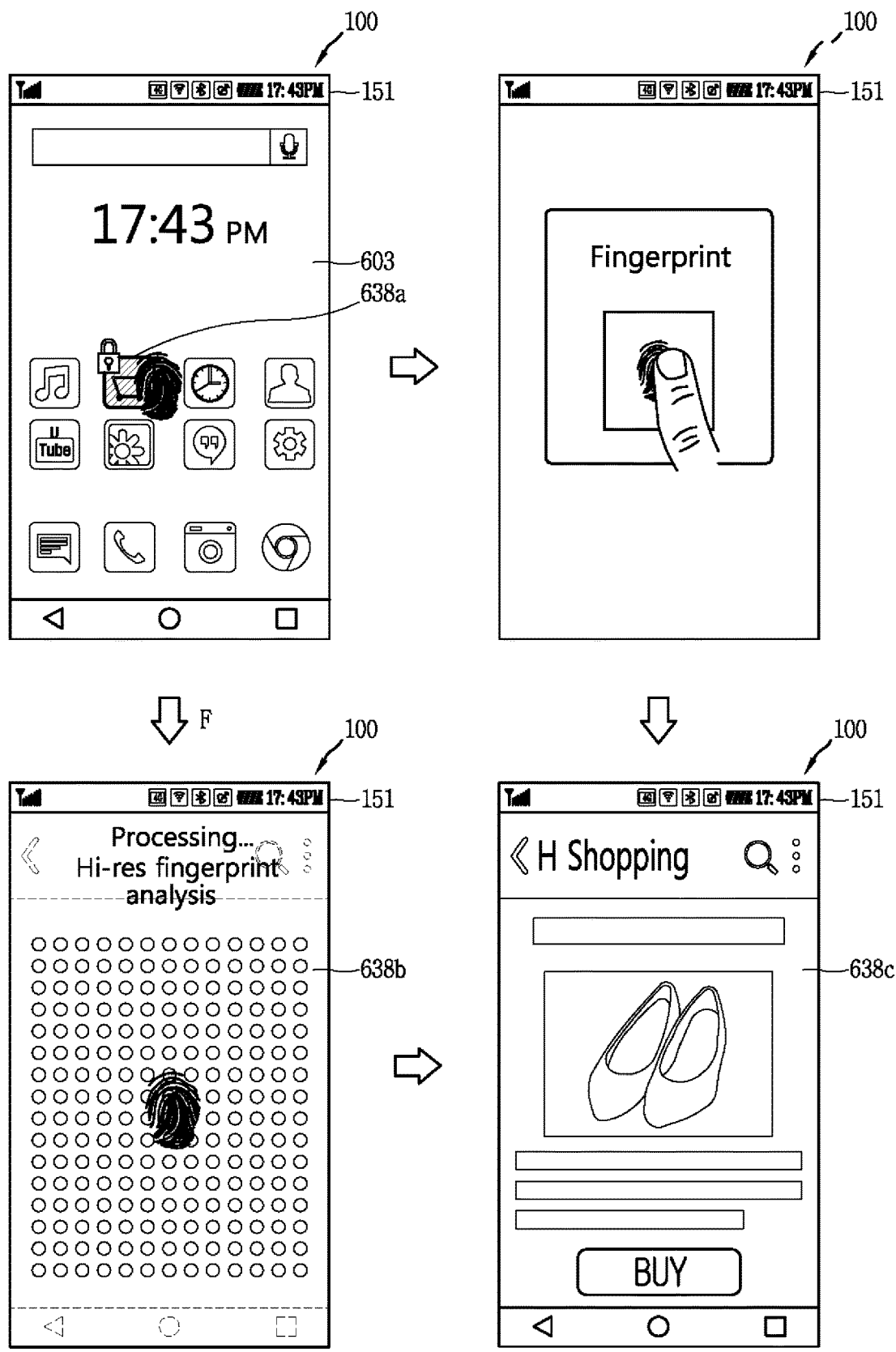

FIGS. 10C and 10D are conceptual views illustrating a control method of a mobile terminal in accordance with another embodiment of the present invention.

Referring to FIG. 10C, the touch screen 151 displays an icon 638a included in a home screen page 603. When a touch input is applied to the icon 638a, the touch screen 151 may display a guide image for instructing a finger input for user authentication. The controller 180 switches the sensing resolution of the touch sensing module 310 to obtain fingerprint information while displaying the guide image.

The controller 180 acquires the fingerprint information when the touch input is applied to the guide image, and controls the touch screen 151 to display an execution screen 638c of the application.

Meanwhile, when pressure of a touch input applied to the icon 638a is sensed, the controller 180 controls the touch sensing module 310 to change the sensing resolution so as to obtain the fingerprint information.

The touch screen 151 displays screen information 638b notifying that the fingerprint recognition is in progress while the fingerprint information is being acquired by the touch input. The controller 180 controls the touch screen 151 to display an execution screen 638c of the application when the fingerprint information is obtained, and the user authentication procedure is completed using the fingerprint information.

Referring to FIG. 10D, the controller 180 executes the application and controls the touch sensing module 310 to obtain fingerprint information while a touch input is being applied to an execution screen of the application. For example, the sensing resolution of the touch sensing module 310 may be alternately changed to the first and second sensing resolutions by the controller 180 so as to receive a touch input to generate a control command and acquire fingerprint information.

For example, when a touch input is applied to a home screen page icon for executing the application, the controller 180 obtains fingerprint information while the touch input is being applied. Fingerprint information is additionally obtained by a touch input applied while first and second execution screens 635a and 635b of the application are sequentially displayed based on the touch input.

The fingerprint information acquired at each step is incomplete, and the controller 180 may combine the fingerprint information acquired from each step to generate one fingerprint information.

The controller 180 determines whether accuracy of fingerprint information acquired from the plurality of steps is equal to or greater than preset accuracy when a function required for user authentication through a fingerprint is executed. When the authentication procedure is completed based on the fingerprint information, the controller 180 displays an execution completion screen 636a without an additional authentication procedure.

Alternatively, the controller 180 may control the touch screen 151 to display a fingerprint authentication screen 636c even when an additional authentication procedure is unnecessary. In this case, a user may apply a touch input for the additional fingerprint authentication.

Alternatively, when the acquired fingerprint information accuracy is equal to or greater than the preset accuracy, the controller 180 displays a confirmation window 636b notifying that the fingerprint information has been acquired so that the user receives a confirmation command for executing the function.

Although not illustrated in the drawings, the controller 180 may perform an additional authentication procedure for acquiring fingerprint information when accuracy of the fingerprint information obtained through the plurality of steps is less than a specific accuracy level.

According to these embodiments, a user can execute a specific function more easily by skipping a user authentication procedure only when reliable fingerprint information is acquired while the user applies a control command.

Figure 11A:
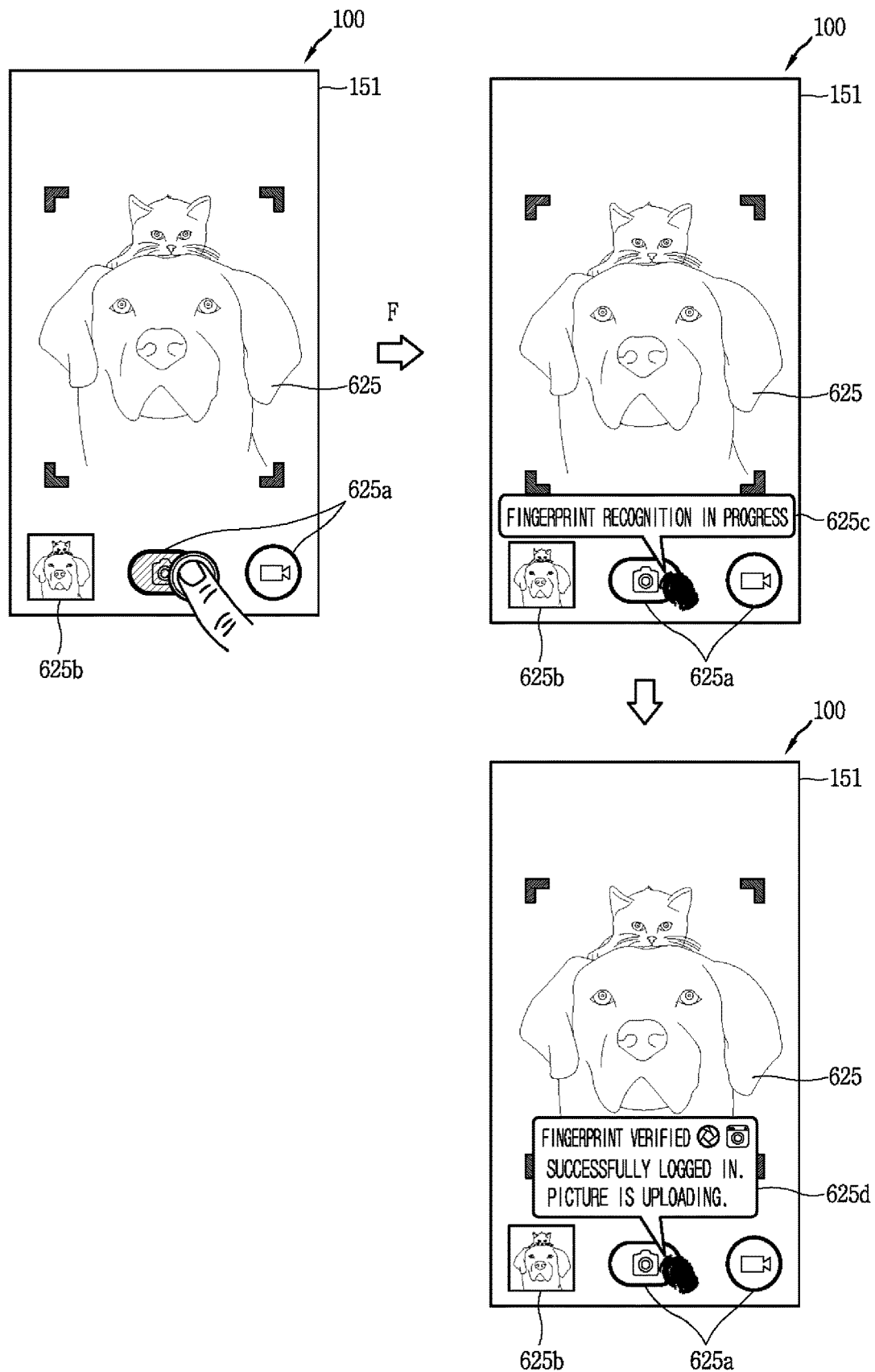
FIGS. 11A to 11C are conceptual views illustrating a control method for executing an additional function through fingerprint information, in accordance with another embodiment of the present invention.
Figure 11B:
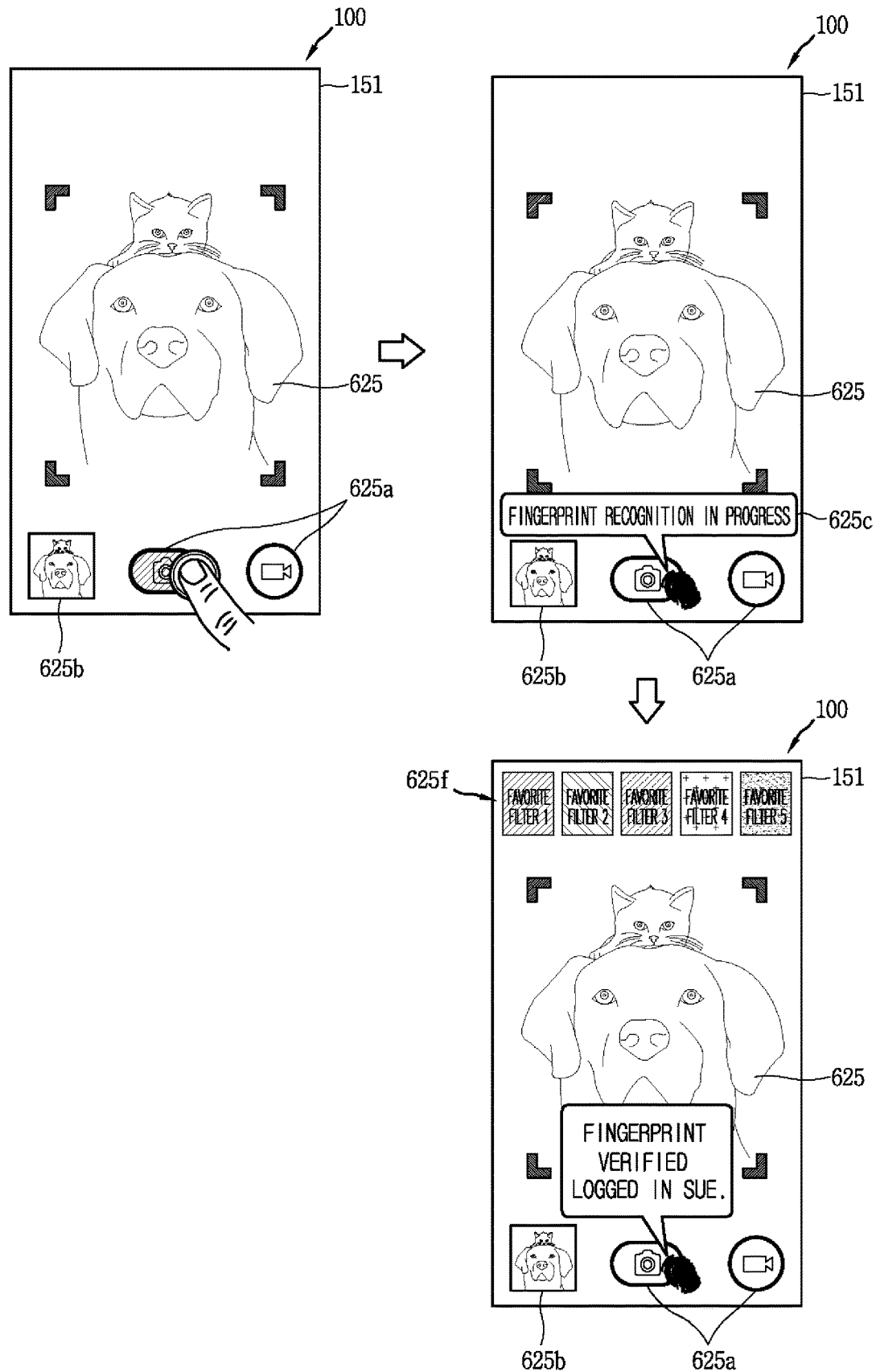
Figure 11C:
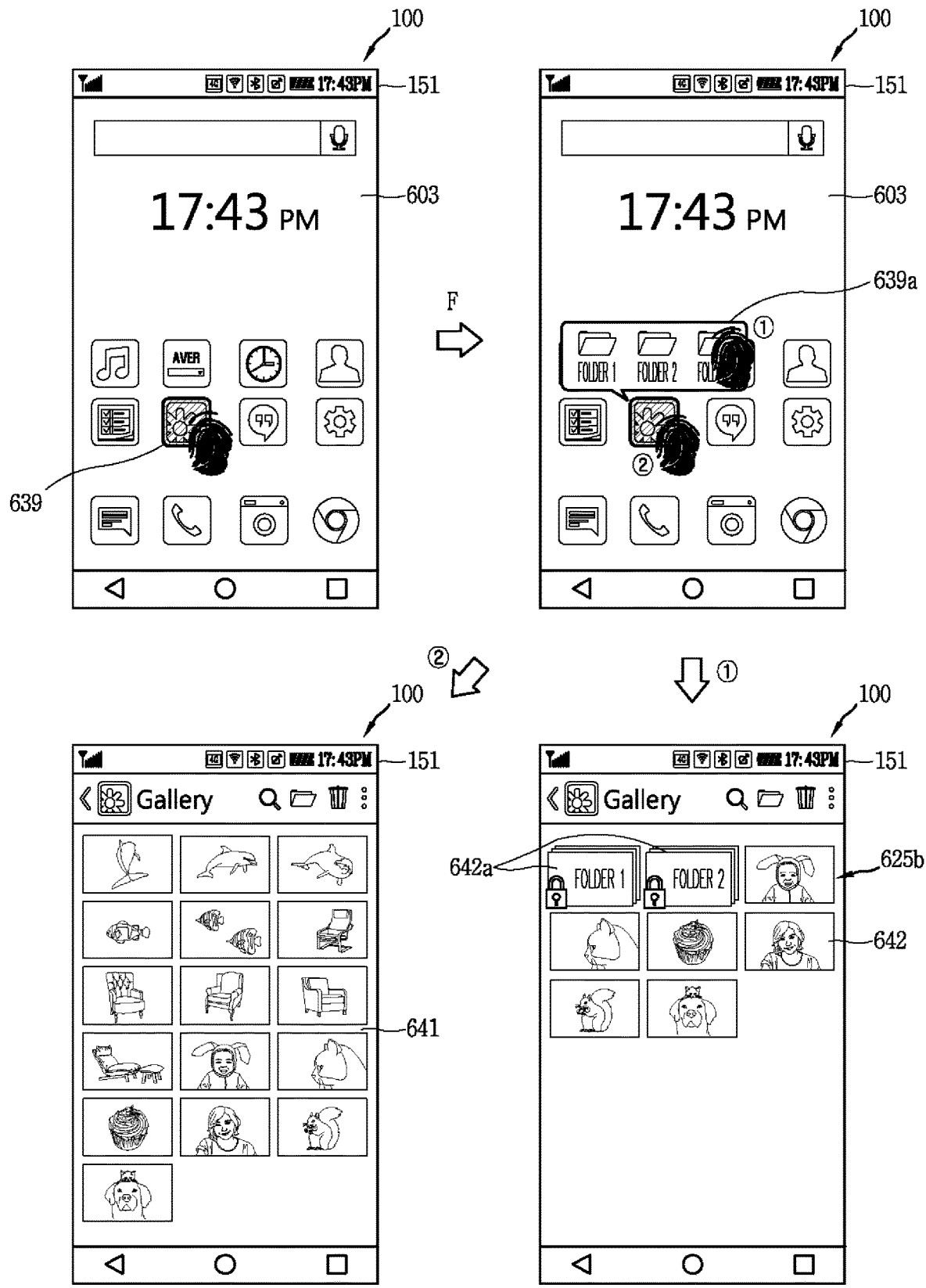

FIGS. 11A to 11C are conceptual views illustrating a control method for executing an additional function through fingerprint information, in accordance with another embodiment of the present invention.

Referring to FIG. 11A, the touch screen 151 displays a preview image 625 obtained by the camera 121. The preview image 625 includes a graphic image 625a for shooting an image (picture) or video (moving image) through the camera 121 and a graphic image 625b for activating a prestored image.

The controller 180 controls the touch sensing module 310 to acquire fingerprint information while a touch input is applied to the graphic image 625b. The touch screen 151 may display an image 625c indicating that fingerprint information is being analyzed while the fingerprint information is obtained.

The controller 180 controls the camera 121 to shoot an image or a video in response to a touch input applied to the graphic image 625b. When the fingerprint information is found to be matched with prestored fingerprint information through user authentication, the controller 180 logs in an account of a specific application. The touch screen 151 displays a guide window 625d indicating a logged in state. The guide window 625d is displayed on the preview image 625. The guide window 625d may include an icon representing an application.

Also, the controller 180 uploads a photographed image (or video) in response to the touch input applied to the logged in application. For example, the controller 180 may transmit the image (or video) to a specific server or to a specific external device.

According to the embodiment of present invention, the controller 180 acquires fingerprint information while a touch input for shooting an image (or a video) is applied, shoots an image (or a video) in response to the touch input, and executes a specific function of the application using a photographed image.

In this case, a user may set the application and a specific function of the application in advance.

Accordingly, the user can execute a desired function without going through complicated steps such as photographing, execution of an application, selection of a photographed image (or video), execution of a function, etc.

Referring to FIG. 11B, the controller 180 shoots an image (or video) in response to a touch applied to the photographing icon 625a. The controller 180 controls the touch sensing module to acquire fingerprint information while the touch input is being applied.

The controller 180 executes an application related to an image shooting filter function together when the fingerprint information is acquired and the authentication procedure is completed. A graphic image 625f indicating the image shooting filter function is displayed on the preview image 625. The graphic image 625f may be created based on history information associated with an authenticated user.

In other words, according to the embodiment, a photographing function can be performed based on a touch input for controlling the photographing function, and execution of a specific application and user authentication can be performed at once.

Referring to FIG. 11C, the touch screen 151 displays a home screen page 603 including an icon 639 of an application. For example, the application may correspond to a gallery application for providing stored images and videos. When a touch is applied to the icon 639, the controller 180 executes the gallery application to display prestored images and videos or folder images including images and videos.

As illustrated in the drawings, when pressure of a touch input applied to the icon 639 is sensed, the controller 180 increases the sensing resolution of the touch sensing module 310 corresponding to an area on which the icon 639 is displayed.

The controller 180 acquires fingerprint information by the touch sensing module 310. The controller 180 displays a pop-up window 639a including a plurality of folder images stored by the application based on the fingerprint information on one area adjacent to the icon 639 of the home screen page 603.

When the controller detects pressure of a touch input applied to one of the folder images of the pop-up windows 639a, the selected one folder image is unlocked. The controller 180 displays an execution screen 642 of the application based on a touch input applied to the folder image.

The controller 180 unlocks the selected folder image only, and controls the touch screen 151 to display a plurality of images 625b included in the unlocked folder. In addition, a folder image 642a indicating a lock state is displayed together with the plurality of images 625b while the rest of the folders which are not selected remain locked.

Meanwhile, when a touch input including touch pressure is detected on the icon 639 while the pop-up window 639a is displayed, all the folders included in the application are unlocked. Accordingly, the touch screen 151 displays an execution screen 641 including a plurality of unlocked images.

According to the embodiment of the present invention, a screen lock state can be unlocked without an additional input by acquiring fingerprint information together with executing an application on a home screen page before displaying an execution screen of the application.

Figure 12A:
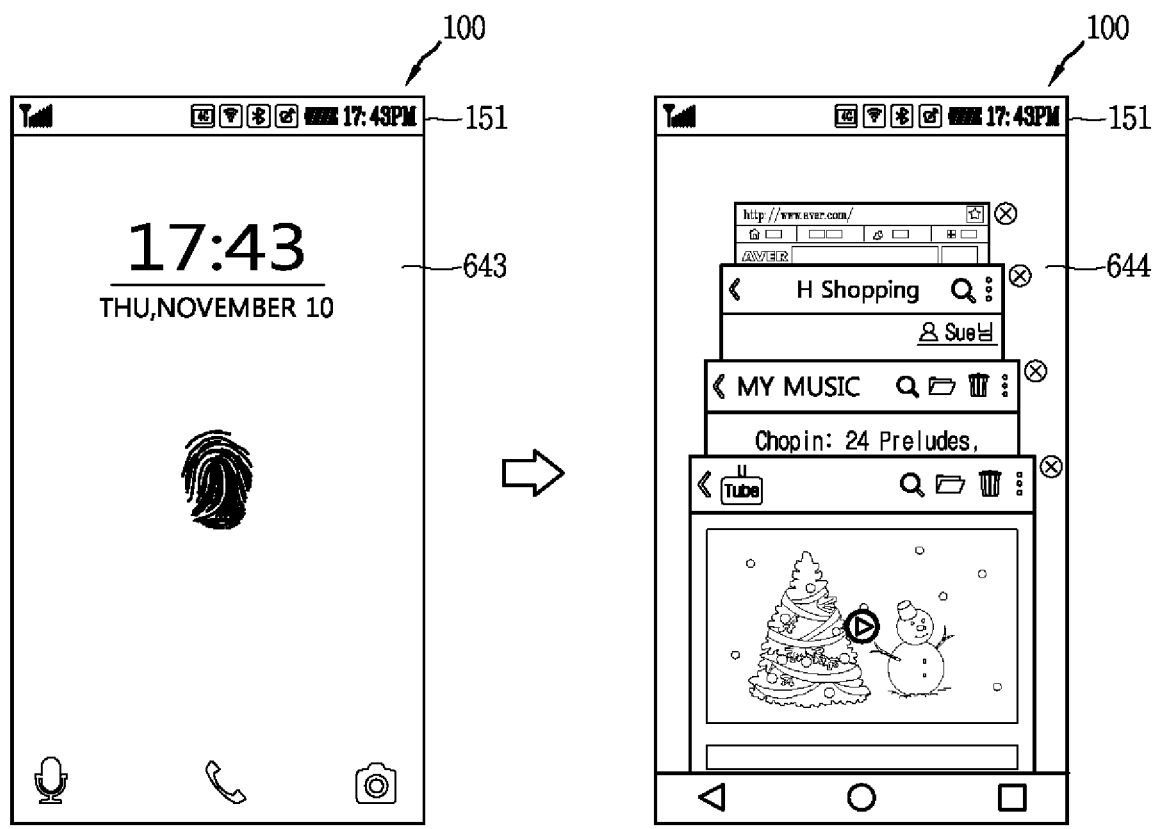
FIGS. 12A to 12C are conceptual views illustrating a control method for executing a specific function based on fingerprint information, in accordance another embodiment of the present invention.
Figure 12B:
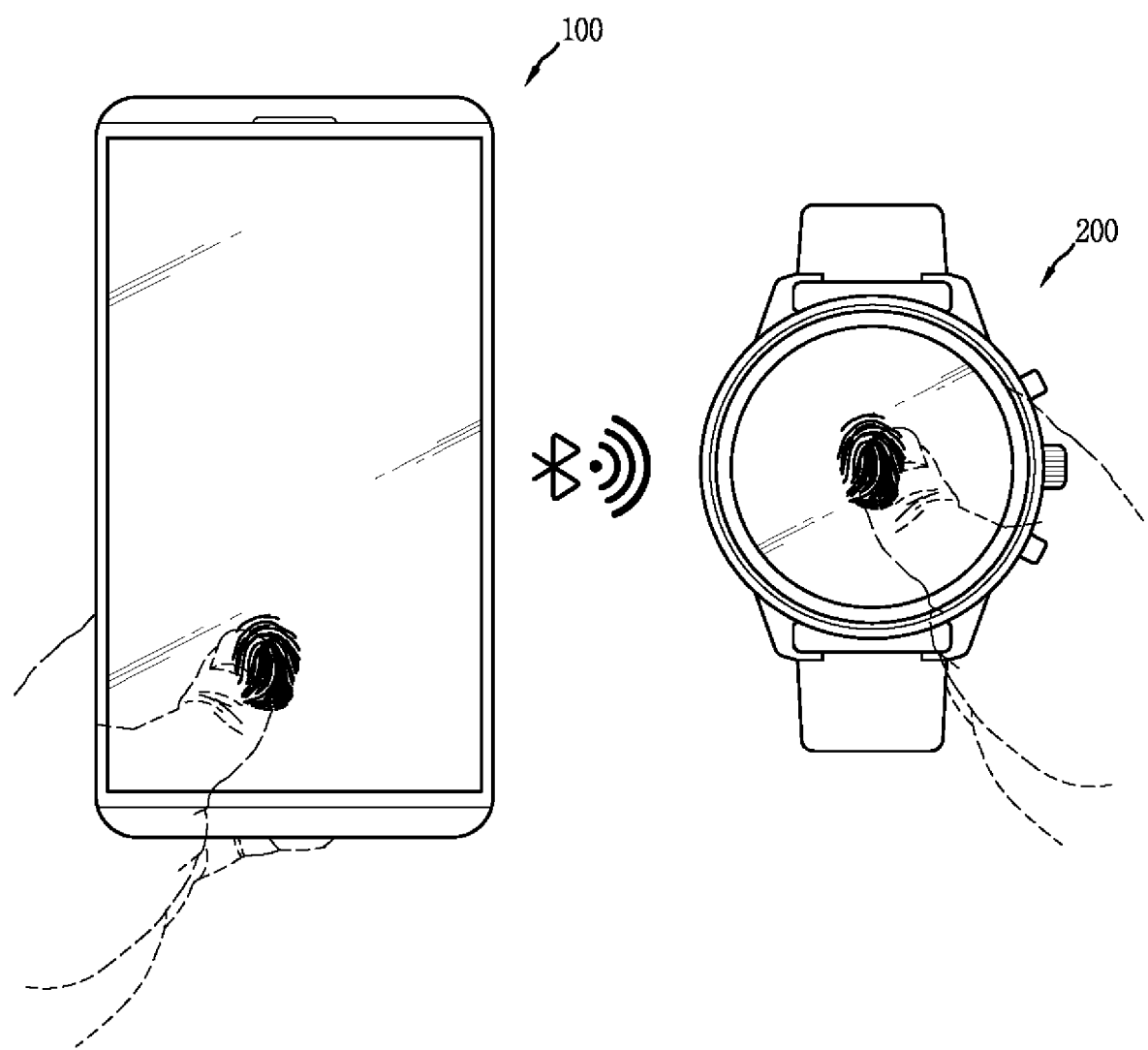
Figure 12C:
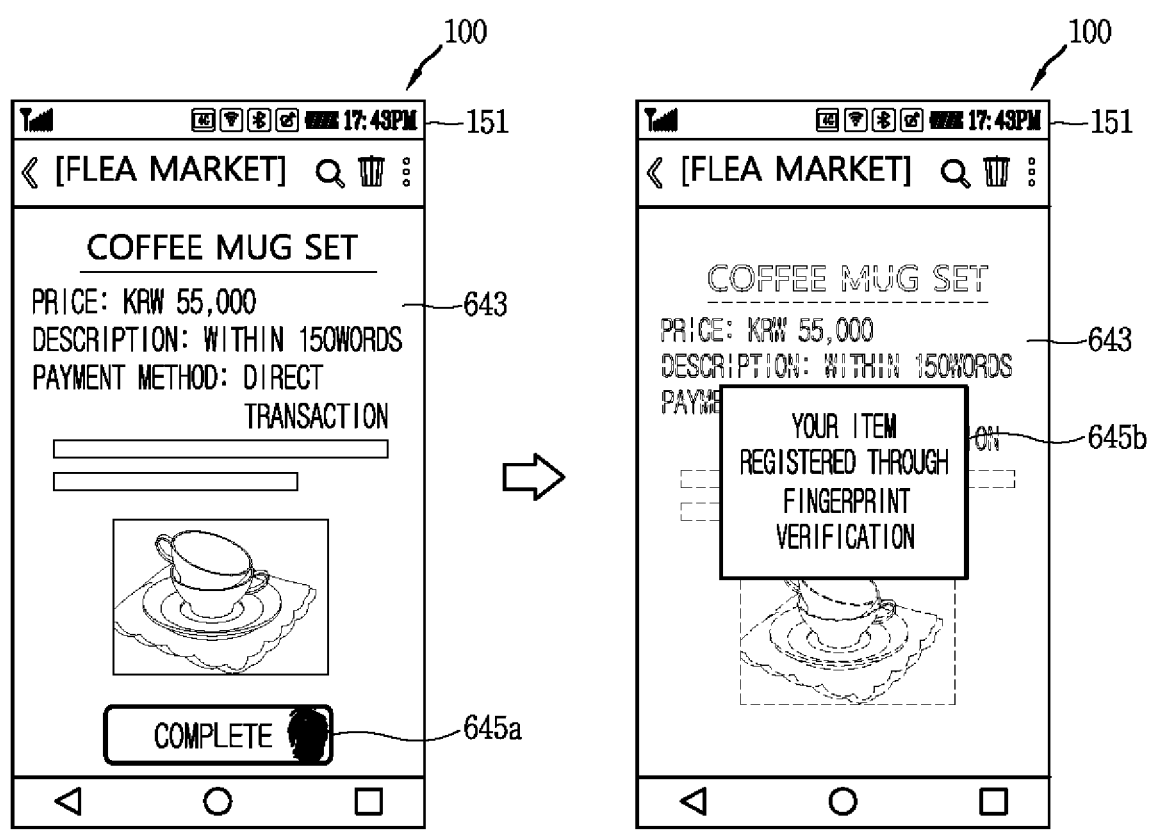

FIGS. 12A to 12C are conceptual views illustrating a control method for executing a specific function based on fingerprint information, in accordance with another embodiment of the present invention.

Referring to FIG. 12A, the touch screen 151 displays a lock screen 643 in a lock state. The controller 180 controls the touch sensor layer 310 to obtain fingerprint information based on a touch input applied onto one area of the lock screen 643. The touch sensing module 310 obtains fingerprint information by switching the sensing resolution of the one area to which the touch input is applied.

The controller 180 unlocks the lock state based on the fingerprint information. When unlocked, the controller 180 controls the touch screen 151 to display an application list 644 indicating applications that have been recently activated.

Accordingly, a user may skip steps of unlocking and activating a list of applications by applying an additional control command.

Referring to FIG. 12B, when the mobile terminal 100 and an external device 200 are wireless connected (BT connection), the controller 180 controls the touch sensing module to acquire fingerprint information of a touch input applied to the touch screen 151.

The controller 180 selects an external device 200 that has fingerprint information substantially identical to the acquired fingerprint information to connect. Accordingly, there is no need for the mobile terminal 100 to search for a unique number of an external device to connect.

FIG. 12C is a conceptual view illustrating a control method for acquiring fingerprint information to input authentication information.

Referring to FIG. 12C, a graphic image 645a for information 643 to be transmitted to a specific server is displayed.

The controller 180 controls the touch sensing module 310 to acquire fingerprint information when a touch input is applied to the graphic image 645a.

The controller 180 compares the fingerprint information with preset fingerprint information to perform a user authentication procedure, and transfers the authentication result to the specific server while transmitting the information 643 based on the touch input.

In other words, when the authentication result and the information 643 are transmitted together based on the fingerprint information, information of a set specific clearance level is transmitted to the specific server. Accordingly, a user authentication procedure or entering additional information for setting a specific clearance level is unnecessary.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

Embodiments of the present invention provide an electronic device having a touch sensing module for sensing a touch input that can acquire fingerprint information. Therefore, these embodiments may be applied to various relevant industrial fields.

The invention claimed is:

1. An electronic device, comprising:
    a touch screen configured to display screen information and receive a touch input;
    a touch sensing module including a first sensing layer having a plurality of first electrode lines and a second sensing layer having a plurality of second electrode lines extending in a direction intersecting the first electrode lines;
    a plurality of first and second switches configured to selectively connect the plurality of first and second electrode lines to a circuit board; and
    a controller configured to:
    in response to the received touch input having a touch pressure below a predetermined pressure, control the first switches to connect respective first electrode lines corresponding to a touch area of the touch input, and execute a first function corresponding the received touch input,
    in response to the received touch input having the touch pressure equal to or above the predetermined pressure, control the second switches to connect respective first and second electrode lines corresponding to the touch area of the touch input to change a first sensing resolution of the touch area to a second sensing resolution higher than the first sensing resolution, and obtain fingerprint information of a finger making contact with the touch area, and
    execute a second function more secure than the first function based on the obtained fingerprint information matching prestored fingerprint information.

2. The electronic device of claim 1, wherein the controller is further configured to group the first electrode lines connected to the first switches and the second electrode lines connected to the first switches into a plurality of respective sensing electrode lines in a touch input mode having the touch pressure below the predetermined pressure.

3. The electronic device of claim 2, further comprising:
    a plurality of grouping switches configured to connect the grouped first and second sensing electrode lines to one single sensing electrode line in the touch input mode.

4. The electronic device of claim 3, wherein the controller is further configured to:
    activate a pen input mode when the touch input is applied to the touch screen by a stylus pen, and
    disconnect the grouped switches so the touch screen has a third sensing resolution, which is higher than the first sensing resolution and lower than the second sensing resolution.

5. The electronic device of claim 4, wherein the controller is further configured to activate one of a fingerprint sensing mode corresponding to the touch input having the touch pressure equal to or above the predetermined pressure, the pen input mode, and the touch input mode based on a range of touch applied to the touch screen.

6. The electronic device of claim 2, wherein the controller is further configured to disconnect part of the plurality of first and second electrode lines, in the touch input mode, from the first and second switches so as not to detect a change in capacitance.

7. The electronic device of claim 1, wherein the controller is further configured to ignore a touch input applied to a remaining area except the touch area receiving the touch input.

8. The electronic device of claim 1, wherein at least part of the plurality of first and second electrode lines includes first and second connecting line portions so as to be connected to the first and second switches, respectively.

9. The electronic device of claim 1, further comprising:
    a cover glass covering the touch screen to form an outer appearance; and
    a pressure sensor disposed below the cover glass so as to sense the pressure of the touch input.

10. The electronic device of claim 9, wherein the pressure sensor includes a deformable layer disposed between the first and second sensing layers.

11. The electronic device of claim 1, wherein the controller is further configured to display an image related to the screen information on the touch screen corresponding to the first function.

12. The electronic device of claim 11, wherein the controller is further configured to:
    perform a user authentication procedure based on the obtained fingerprint information, and
    display information on the touch screen related to a result of the authentication procedure.

13. The electronic device of claim 11, wherein the controller is further configured to display a lock screen on the touch screen indicating a screen lock state, and
    display the screen information on the lock screen when a specific event occurs.

14. The electronic device of claim 11, wherein the controller is further configured to stop displaying the image on the touch screen when the touch input is released from the touch screen.

15. The electronic device of claim 14, wherein the controller is further configured to display the image on the lock screen in a form of a pop-up window.

16. The electronic device of claim 1, wherein the controller is further configured to:
- control the touch sensing module to acquire a plurality of fingerprint information when a plurality of touch inputs are applied to the touch screen, and
- generate single fingerprint information by combining the plurality of fingerprint information.

* * * * *